United States Patent
Balsells et al.

(10) Patent No.: US 11,235,374 B2
(45) Date of Patent: *Feb. 1, 2022

(54) CANTED COIL SPRINGS AND ASSEMBLIES AND RELATED METHODS

(71) Applicant: Bal Seal Engineering, LLC, Foothill Ranch, CA (US)

(72) Inventors: Peter J. Balsells, Newport Beach, CA (US); Jin Kim, Foothill Ranch, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/875,879

(22) Filed: May 15, 2020

(65) Prior Publication Data
US 2020/0276633 A1    Sep. 3, 2020

Related U.S. Application Data

(63) Continuation of application No. 15/351,079, filed on Nov. 14, 2016, now Pat. No. 10,668,521, which is a
(Continued)

(51) Int. Cl.
*B21F 35/00* (2006.01)
*B21F 35/02* (2006.01)
*F16F 1/04* (2006.01)

(52) U.S. Cl.
CPC .............. *B21F 35/00* (2013.01); *B21F 35/02* (2013.01); *F16F 1/045* (2013.01); *F16F 2226/04* (2013.01); *Y10T 29/49609* (2015.01)

(58) Field of Classification Search
CPC .......... B21F 35/00; B21F 35/02; B21F 35/04; B21F 3/02; B21F 3/04; F16F 1/045
See application file for complete search history.

(56) References Cited

U.S. PATENT DOCUMENTS 3,174,500 A    3/1965  Johnson et al.
4,655,462 A    4/1987  Balsells
(Continued)

FOREIGN PATENT DOCUMENTS

DE    19807663       9/1999
GB    2194298        3/1988
WO    WO 03067713    8/2003

OTHER PUBLICATIONS

Extended European Search Report from European Patent Office on corresponding EP application (EP13855367.2) dated May 24, 2016.
(Continued)

*Primary Examiner* — Jimmy T Nguyen
*Assistant Examiner* — Mohammed S. Alawadi
(74) *Attorney, Agent, or Firm* — Klein, O'Neill & Singh, LLP

(57) ABSTRACT

Canted coil spring rings each with a first plurality of coils having first coil major and minor axes; a second plurality of coils each having second coil major and minor axes; the coils of the first plurality of coils alternating with the coils of the second plurality of coils according to an alternating pattern. The spring rings having inner and outer perimeters and wherein the inner perimeter of the spring ring is defined by at least said first plurality of coils. The resulting configuration of the spring ring has improved spacing along the inner perimeter, among others, with respect to a similar canted coil spring ring having a constant coil cross section, such as a coil length with all similar coils.

26 Claims, 25 Drawing Sheets

Related U.S. Application Data continuation of application No. 14/078,125, filed on Nov. 12, 2013, now Pat. No. 9,518,626.

(60) Provisional application No. 61/725,938, filed on Nov. 13, 2012.

(56) References Cited

U.S. PATENT DOCUMENTS

| | | | |
|---|---|---|---|
| 4,678,210 A | 7/1987 | Balsells | |
| 4,826,144 A | 5/1989 | Balsells | |
| 4,830,344 A | 5/1989 | Balsells | |
| 4,872,710 A | 10/1989 | Konecny et al. | |
| 4,876,781 A | 10/1989 | Balsells | |
| 4,893,795 A | 1/1990 | Balsells | |
| 4,907,788 A | 3/1990 | Balsells | |
| 4,915,366 A | 4/1990 | Balsells | |
| 4,934,666 A | 6/1990 | Balsells | |
| 4,961,253 A | 10/1990 | Balsells | |
| 4,964,204 A | 10/1990 | Balsells | |
| 4,974,821 A | 12/1990 | Balsells | |
| 5,088,192 A | 2/1992 | Dempsey | |
| 5,108,078 A | 4/1992 | Balsells | |
| 5,139,243 A | 8/1992 | Balsells | |
| 5,139,276 A * | 8/1992 | Balsells | F16F 1/04 267/1.5 |
| 5,149,642 A | 9/1992 | Mazur et al. | |
| 5,160,122 A * | 11/1992 | Balsells | F16F 1/045 267/1.5 |
| 5,203,849 A * | 4/1993 | Balsells | F16F 1/04 267/1.5 |
| 5,239,737 A * | 8/1993 | Balsells | F16F 1/045 29/896.9 |
| 5,411,348 A | 5/1995 | Balsells | |
| 5,503,375 A * | 4/1996 | Balsells | F16F 3/04 267/167 |
| 5,545,842 A | 8/1996 | Balsells | |
| 5,570,719 A | 11/1996 | Richards et al. | |
| 5,709,371 A * | 1/1998 | Balsells | F16F 1/123 267/167 |
| 5,791,638 A * | 8/1998 | Balsells | F16F 3/04 267/167 |
| 5,878,998 A * | 3/1999 | Hsieh | F16F 1/046 267/166.1 |
| 6,672,565 B2 | 1/2004 | Russell | |
| 6,835,084 B2 | 12/2004 | Poon et al. | |
| 7,055,812 B2 * | 6/2006 | Balsells | F16F 1/045 267/166 |
| 7,538,289 B2 | 5/2009 | Carroll | |
| 7,722,415 B2 | 5/2010 | Changsrivong | |
| 7,841,088 B2 * | 11/2010 | Ogura | F16F 1/04 29/896.91 |
| 7,880,578 B2 * | 2/2011 | Meinke | G01R 33/34007 336/188 |
| 7,914,315 B2 | 3/2011 | Kuhn et al. | |
| 7,914,351 B2 | 3/2011 | Balsells et al. | |
| 7,985,105 B2 | 7/2011 | Balsells | |
| 8,052,459 B2 | 11/2011 | Smith et al. | |
| 8,096,842 B2 | 1/2012 | Poon et al. | |
| 8,308,167 B2 | 11/2012 | Balsells et al. | |
| 8,336,864 B2 | 12/2012 | Noh | |
| 8,382,532 B2 | 2/2013 | Sjostedt et al. | |
| 8,491,346 B2 | 7/2013 | Sjostedt et al. | |
| 8,561,274 B2 | 10/2013 | Balsells | |
| 8,590,867 B2 | 11/2013 | Leon | |
| 8,735,751 B2 * | 5/2014 | Rust | H01R 13/187 200/276 |
| 9,004,805 B2 | 4/2015 | Changsrivong et al. | |
| 9,267,526 B2 | 2/2016 | Balsells | |
| 9,273,742 B2 | 3/2016 | Balsells et al. | |
| 9,284,970 B2 | 3/2016 | Dilmaghanian et al. | |
| 9,312,630 B2 | 4/2016 | Huang | |
| 9,482,255 B2 | 11/2016 | Changsrivong et al. | |
| 9,500,211 B2 | 11/2016 | Changsrivong | |
| 9,518,626 B2 | 12/2016 | Balsells et al. | |
| 9,534,625 B2 | 1/2017 | Balsells | |
| 9,677,587 B2 | 6/2017 | Changsrivong et al. | |
| 2002/0122690 A1 | 9/2002 | Poon et al. | |
| 2003/0094812 A1 | 5/2003 | Balsells | |
| 2003/0096526 A1 | 5/2003 | Balsells | |
| 2004/0070128 A1 * | 4/2004 | Balsells | F16F 1/045 267/180 |
| 2004/0175229 A1 | 9/2004 | Balsells | |
| 2004/0245686 A1 * | 12/2004 | Balsells | F16B 21/18 267/1.5 |
| 2006/0228166 A1 | 10/2006 | Balsells | |
| 2009/0039728 A1 | 2/2009 | Balsells | |
| 2010/0090379 A1 * | 4/2010 | Balsells | F16L 37/122 267/1.5 |
| 2010/0279558 A1 | 11/2010 | Leon et al. | |
| 2010/0289198 A1 * | 11/2010 | Balsells | B21F 35/00 267/151 |
| 2011/0062640 A1 | 3/2011 | Leon | |
| 2011/0068523 A1 | 3/2011 | Noh | |
| 2011/0263164 A1 * | 10/2011 | Lenhert | F16F 1/045 439/816 |
| 2012/0098179 A1 * | 4/2012 | Jaster | F16F 1/045 267/166 |
| 2012/0174398 A1 | 7/2012 | Rust et al. | |
| 2013/0149031 A1 | 6/2013 | Changsrivong et al. | |
| 2014/0130329 A1 | 5/2014 | Changsrivong et al. | |
| 2014/0162487 A1 | 6/2014 | Frederick et al. | |
| 2014/0259617 A1 | 9/2014 | Kompa et al. | |
| 2014/0378008 A1 | 12/2014 | Young et al. | |
| 2015/0159718 A1 * | 6/2015 | Meier | F16F 1/045 267/167 |
| 2015/0240900 A1 | 8/2015 | Poon et al. | |
| 2015/0316115 A1 | 11/2015 | Carter | |
| 2016/0076568 A1 | 3/2016 | Dilmaghanian et al. | |
| 2016/0204557 A1 | 7/2016 | Kim | |
| 2016/0265574 A1 | 9/2016 | Ghasiri | |
| 2017/0352984 A1 | 12/2017 | Changsrivong et al. | |
| 2017/0373425 A1 | 12/2017 | Rust | |

OTHER PUBLICATIONS

International Search Report and Written Opinion on corresponding PCT application (PCT/US2013/069814) from International Searching Authority (KR) dated Feb. 17, 2014.

Non-Final Office Action on co-pending (U.S. Appl. No. 14/078,125) dated Feb. 11, 2015.

Non-Final Office Action on co-pending (U.S. Appl. No. 15/351,079) dated Oct. 10, 2019.

Bal Seal Canted Coil Springs, Circular and Spring Lengths for Radial and Axial Loading, Calatog No. DM3Mm, Rev. A, Jul. 17, 1992, Bal Seal Engineering Company, Inc., Santa Ana, CA, U.S.A., (24 pages).

Latching and Holding With Bal Seal Canted-Coil Circular Welding Springs, Product News #164D, Nov. 23, 1991, Bal Seal Engineering Company, Inc., Santa Ana, California, U.S.A., (6 pages).

* cited by examiner

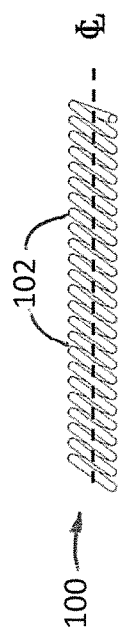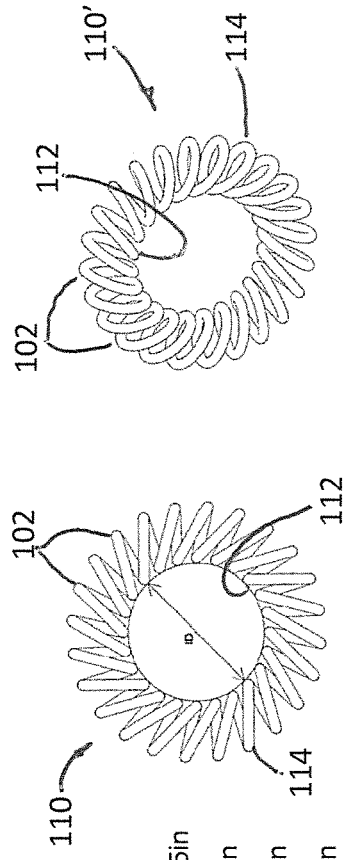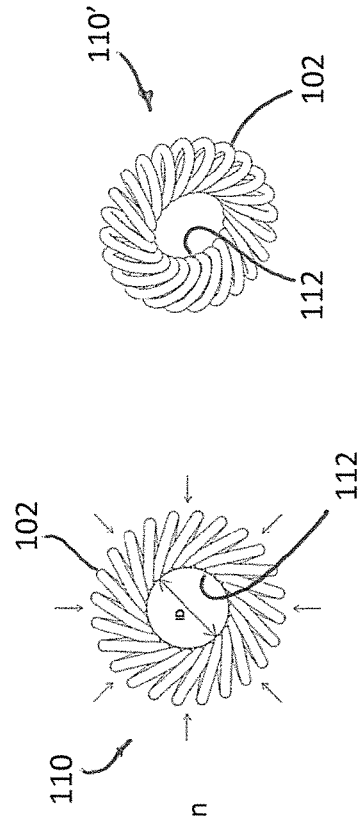

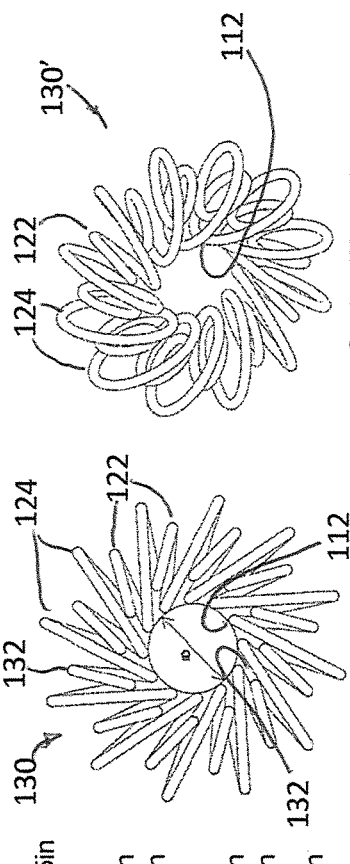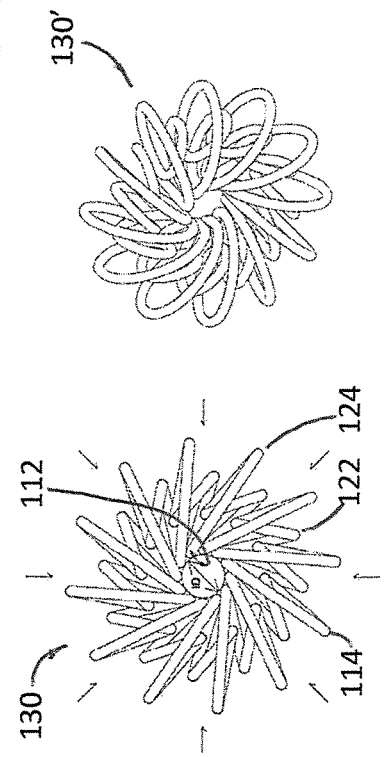

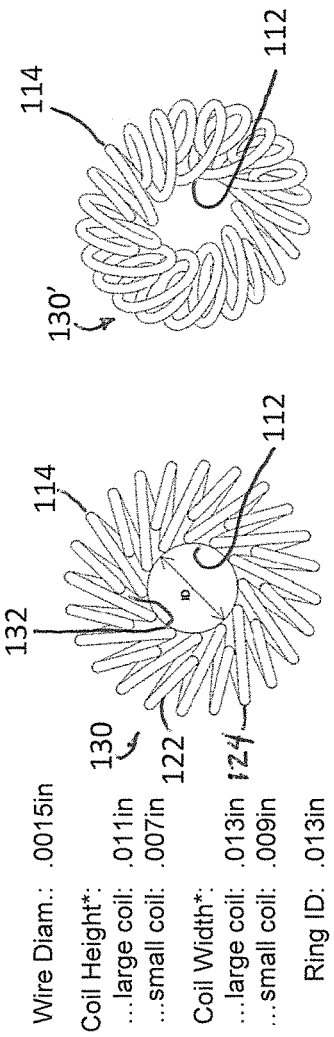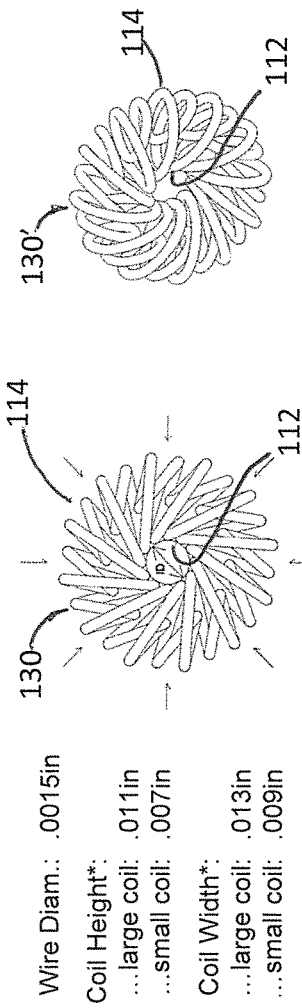

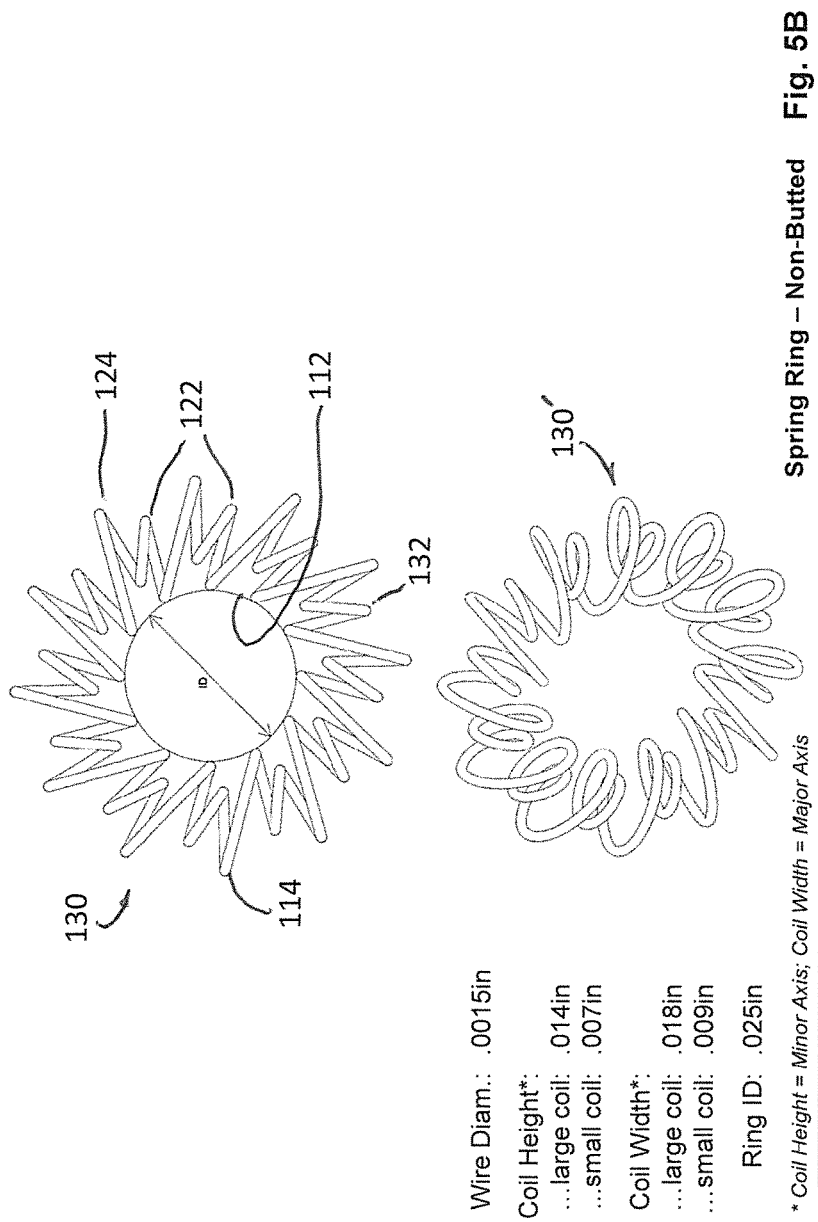

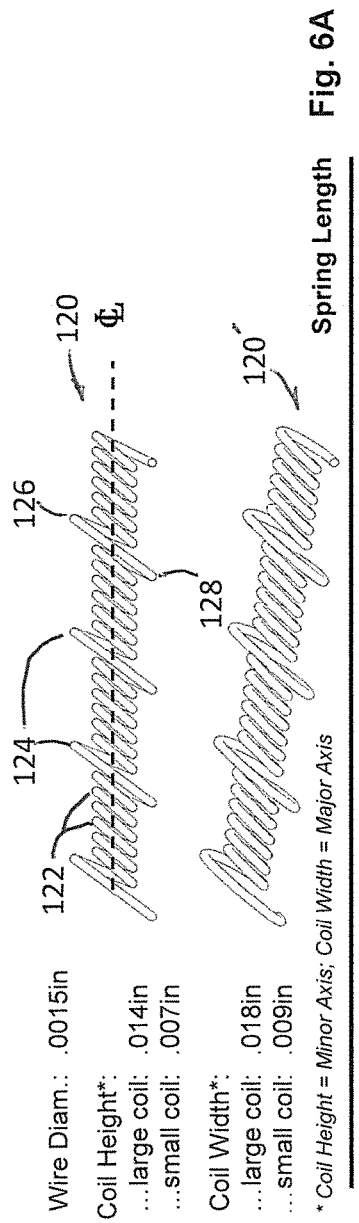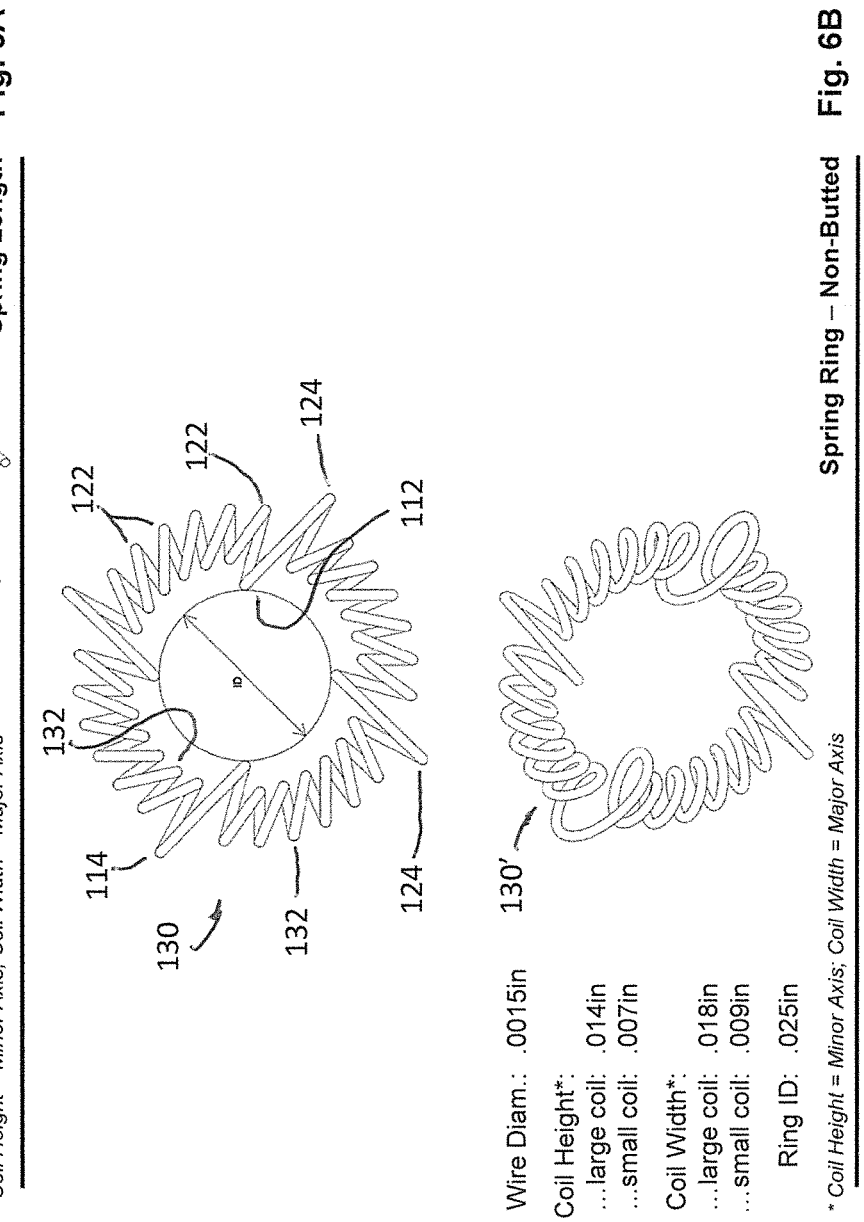
Fig. 6A
Fig. 6B

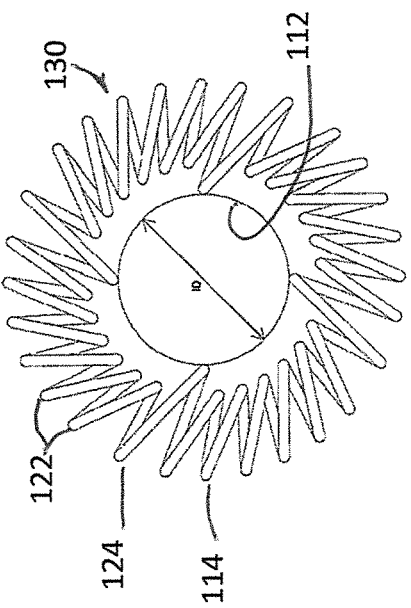
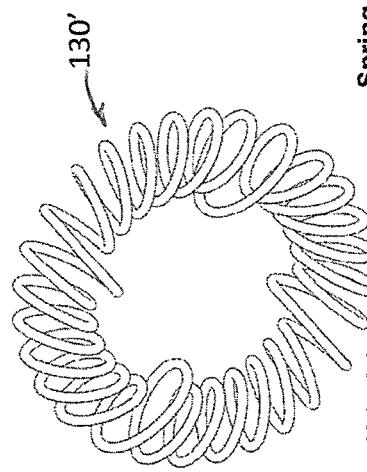
Fig. 8A  Spring Length
Wire Diam.: .0015in
Coil Height*:
...large coil: .014in
...small coil: .010in
Coil Width*:
...large coil: .018in
...small coil: .013in
* Coil Height = Minor Axis; Coil Width = Major Axis
Fig. 8B  Spring Ring – Non-Butted
Wire Diam.: .0015in
Coil Height*:
...large coil: .014in
...small coil: .010in
Coil Width*:
...large coil: .018in
...small coil: .013in
Ring ID: .025in
* Coil Height = Minor Axis; Coil Width = Major Axis

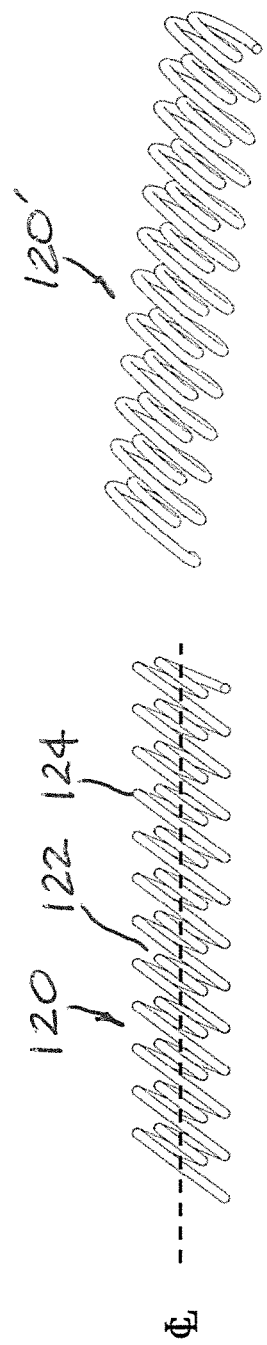
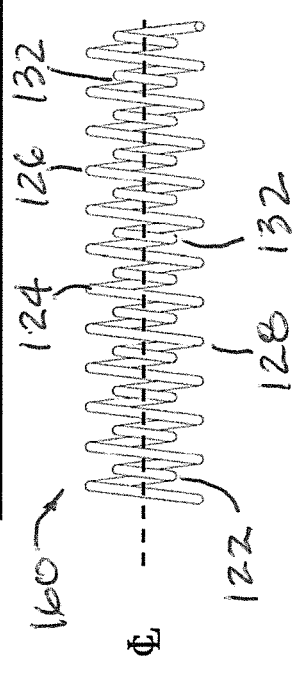
Canted Coil Spring – Variable Coil Dimensions
Fig. 12A
Helical Spring – Variable Coil Dimensions
Fig. 12B

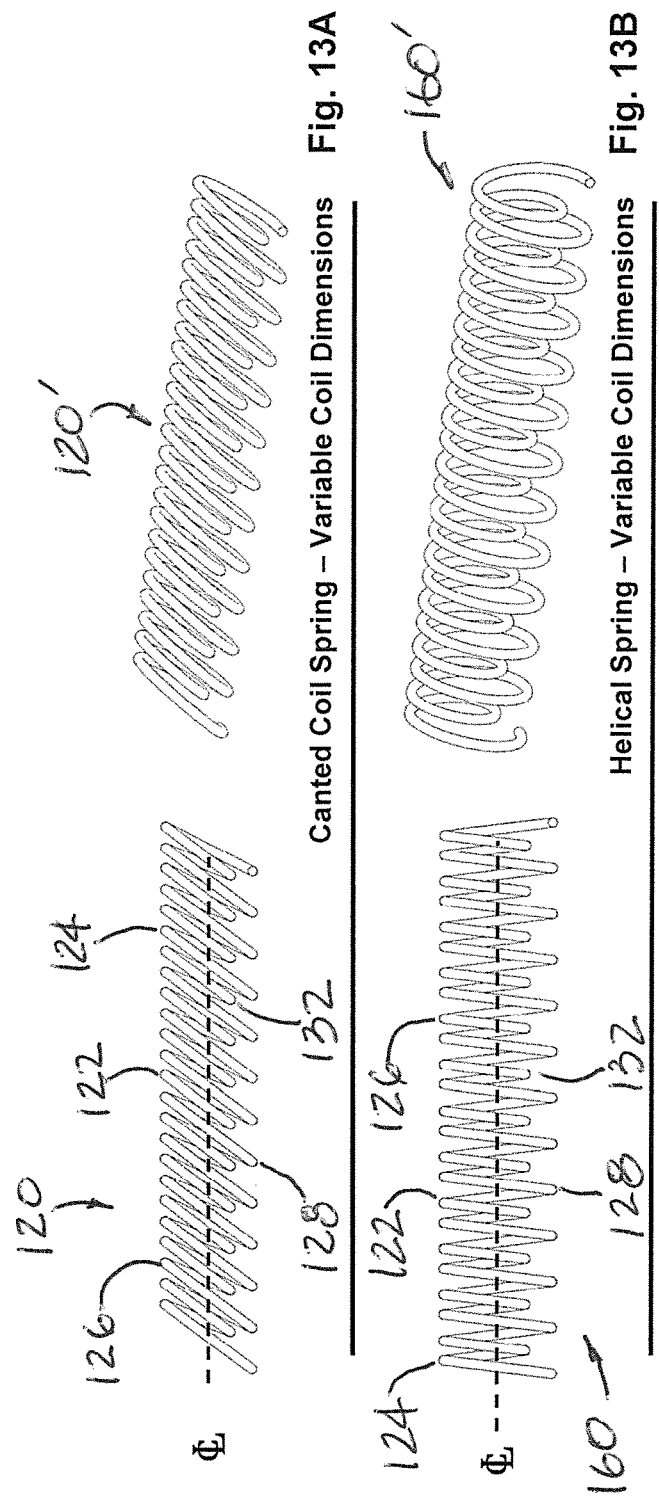

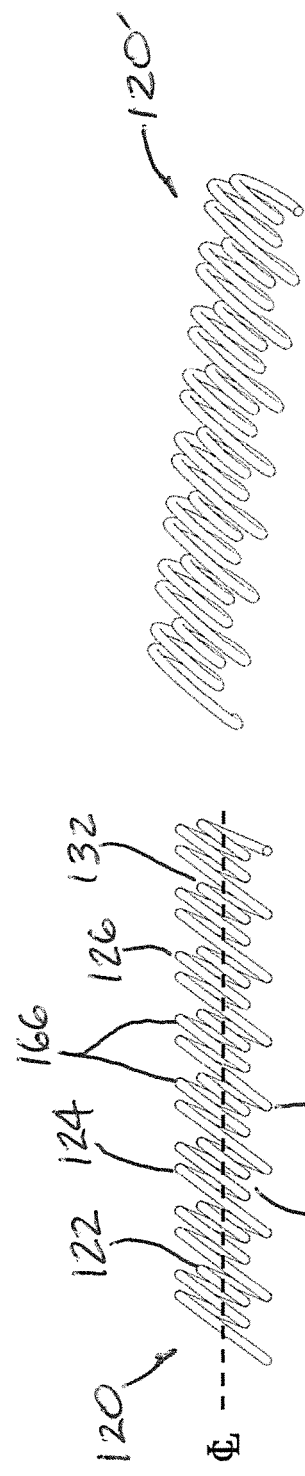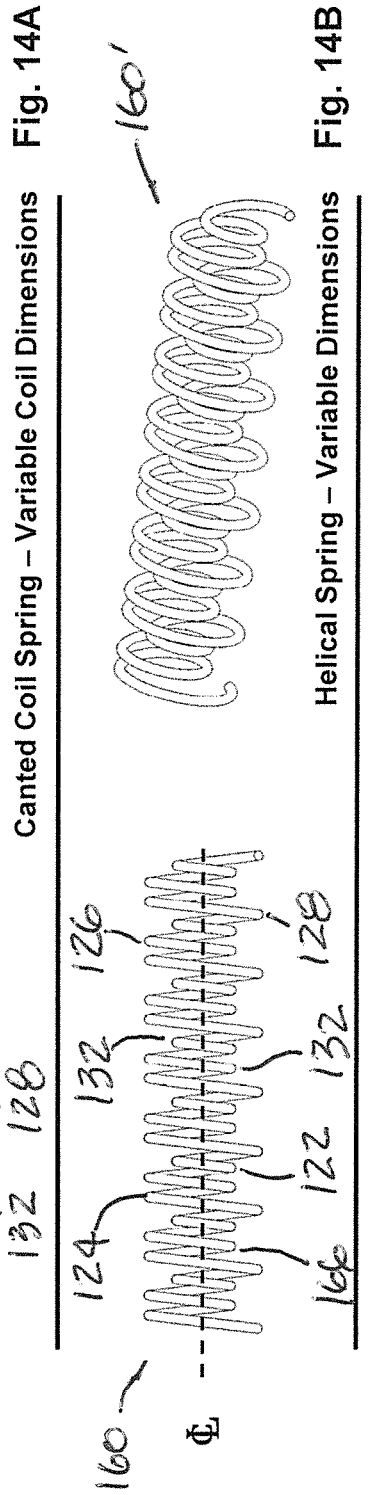
Fig. 14A Canted Coil Spring – Variable Coil Dimensions
Fig. 14B Helical Spring – Variable Dimensions

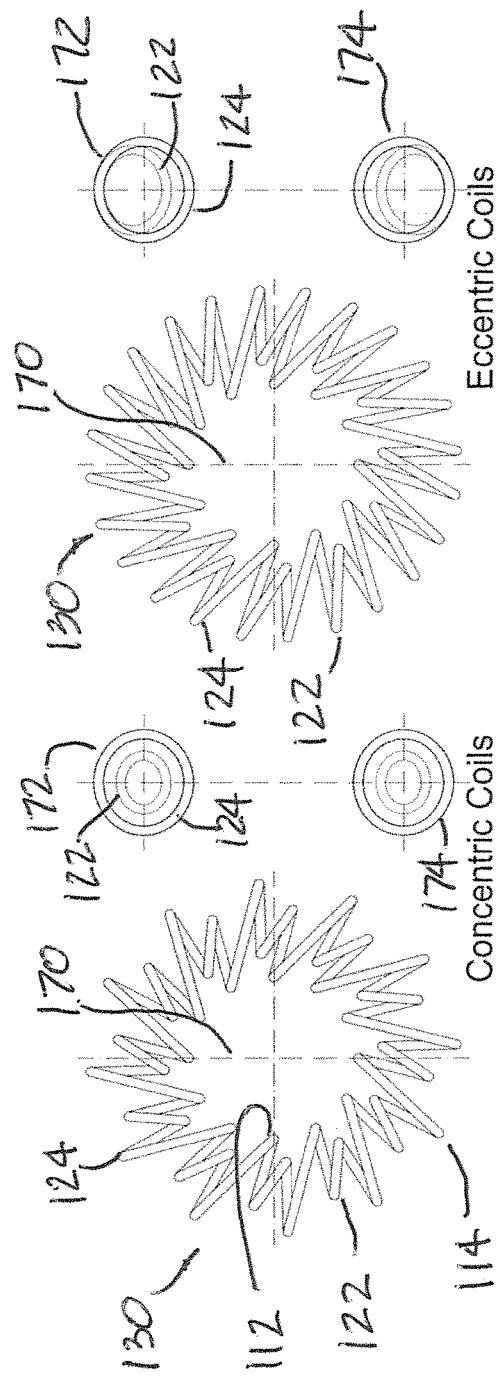
Fig. 15A
Fig. 15B
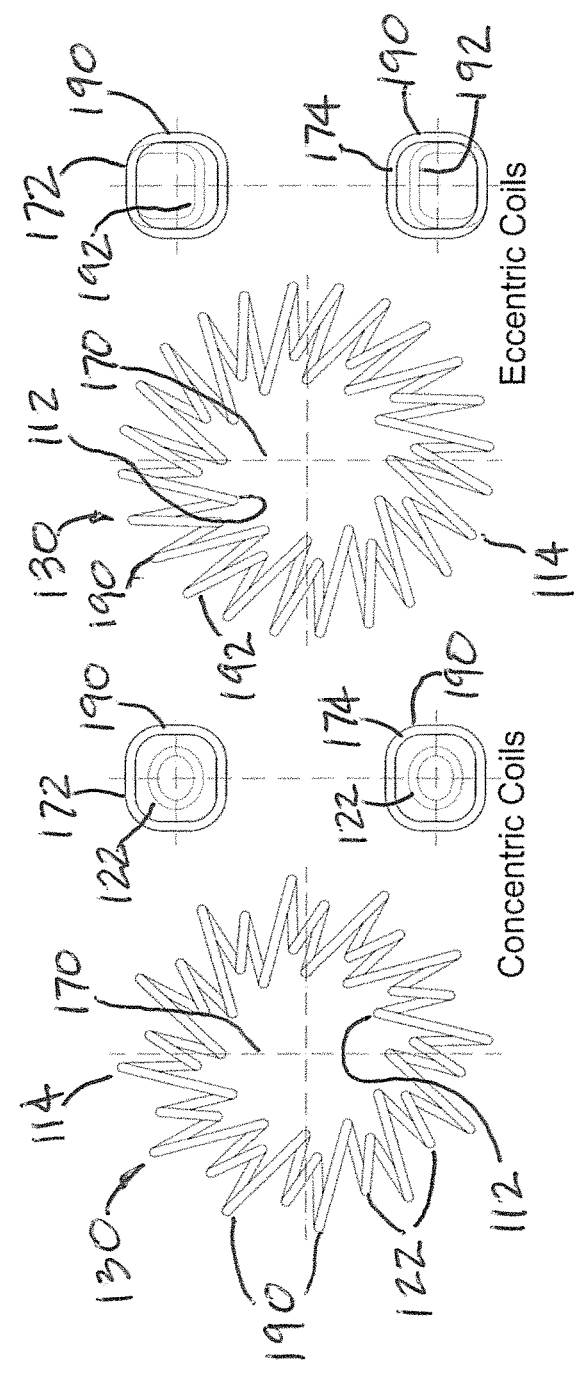
Fig. 15C
Fig. 15D

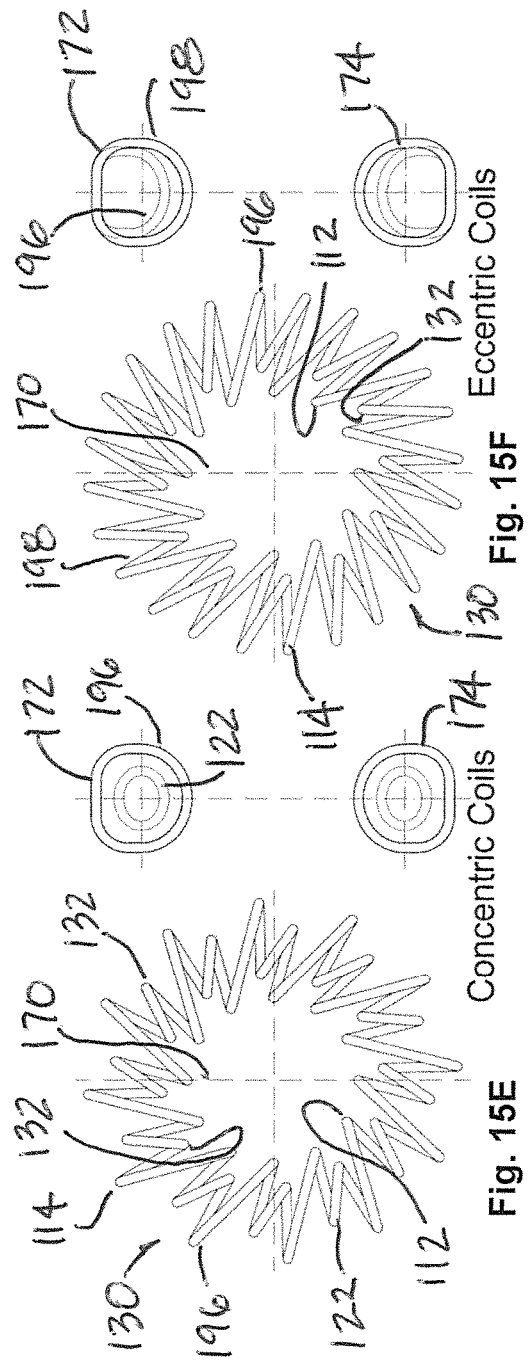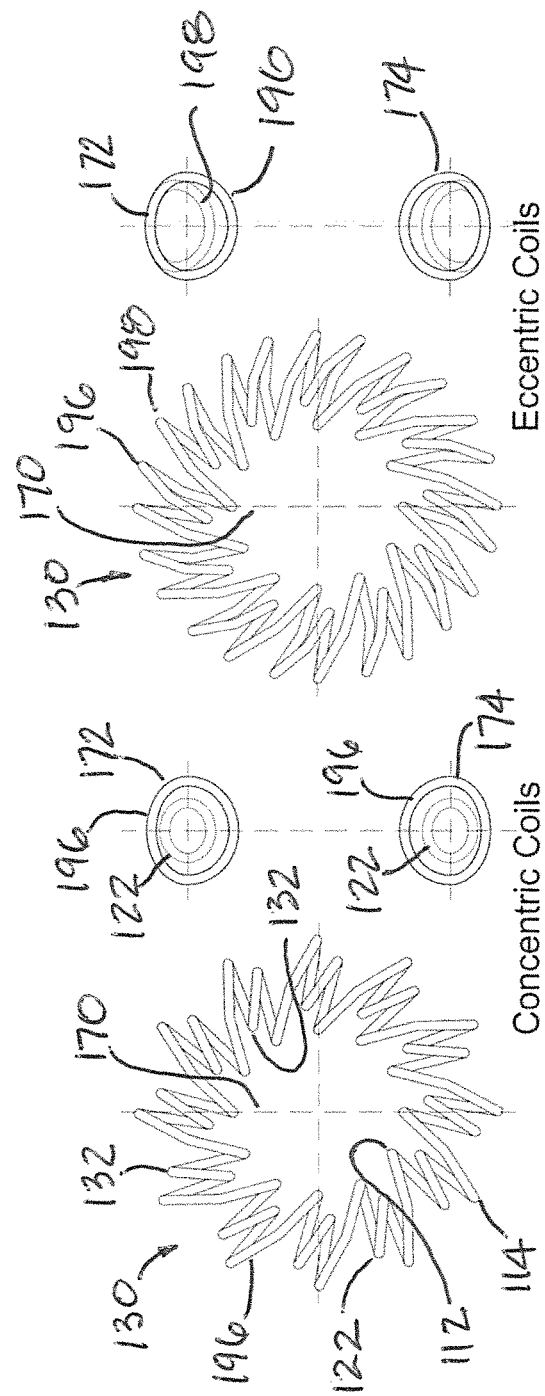

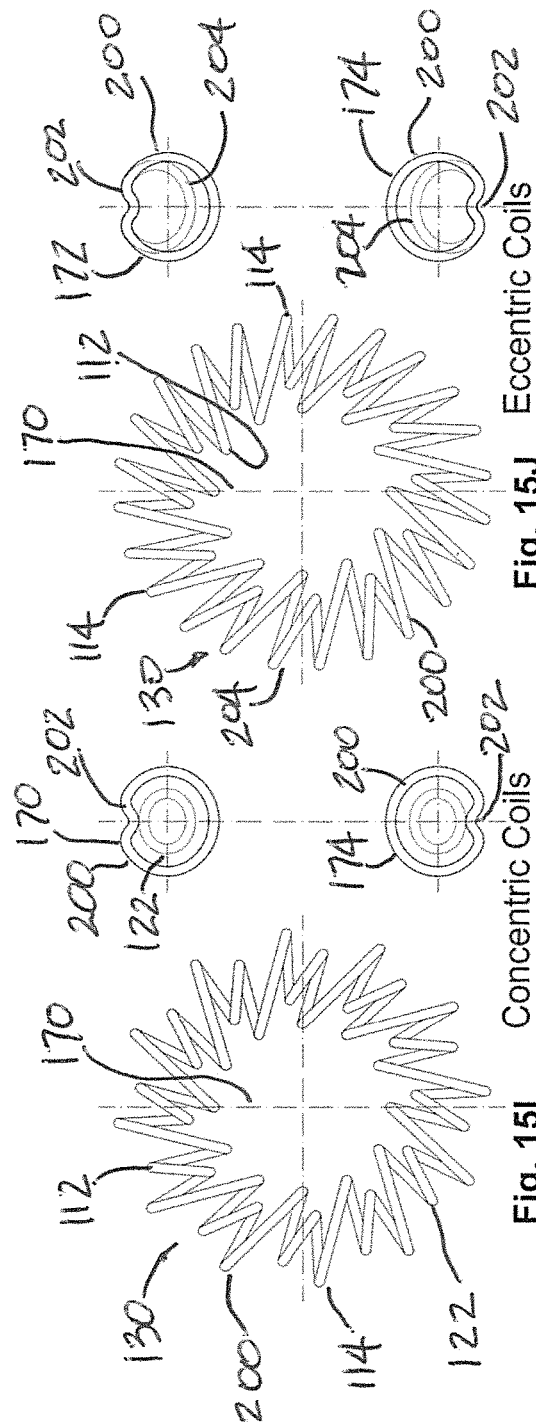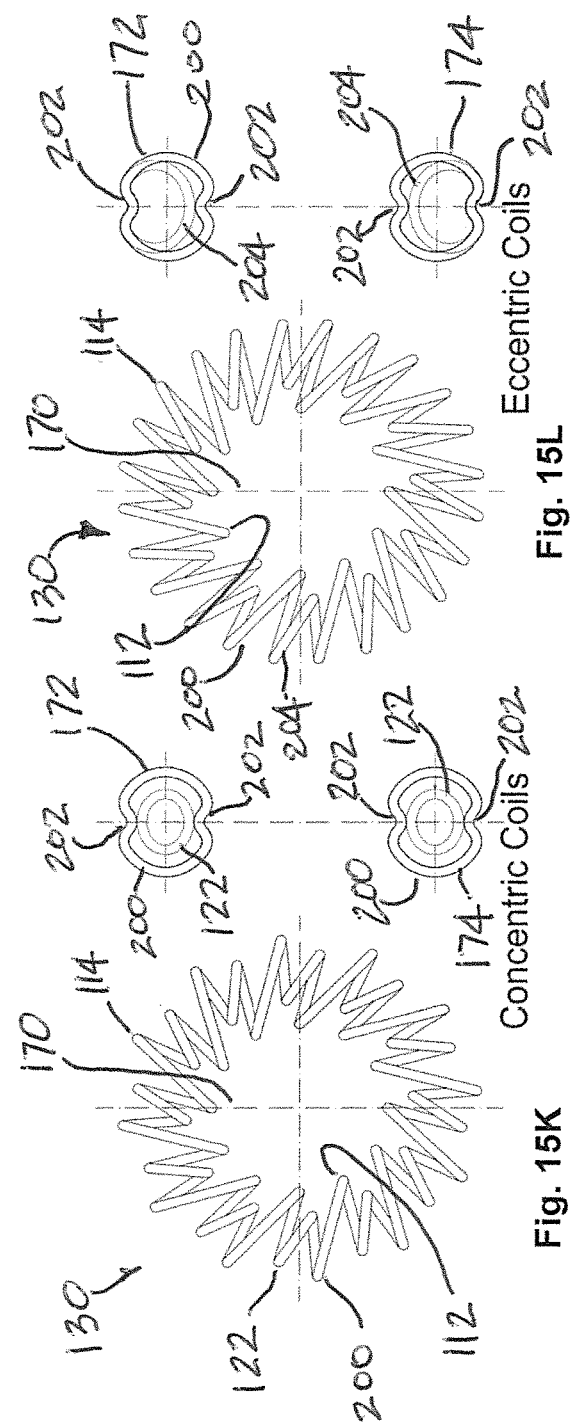

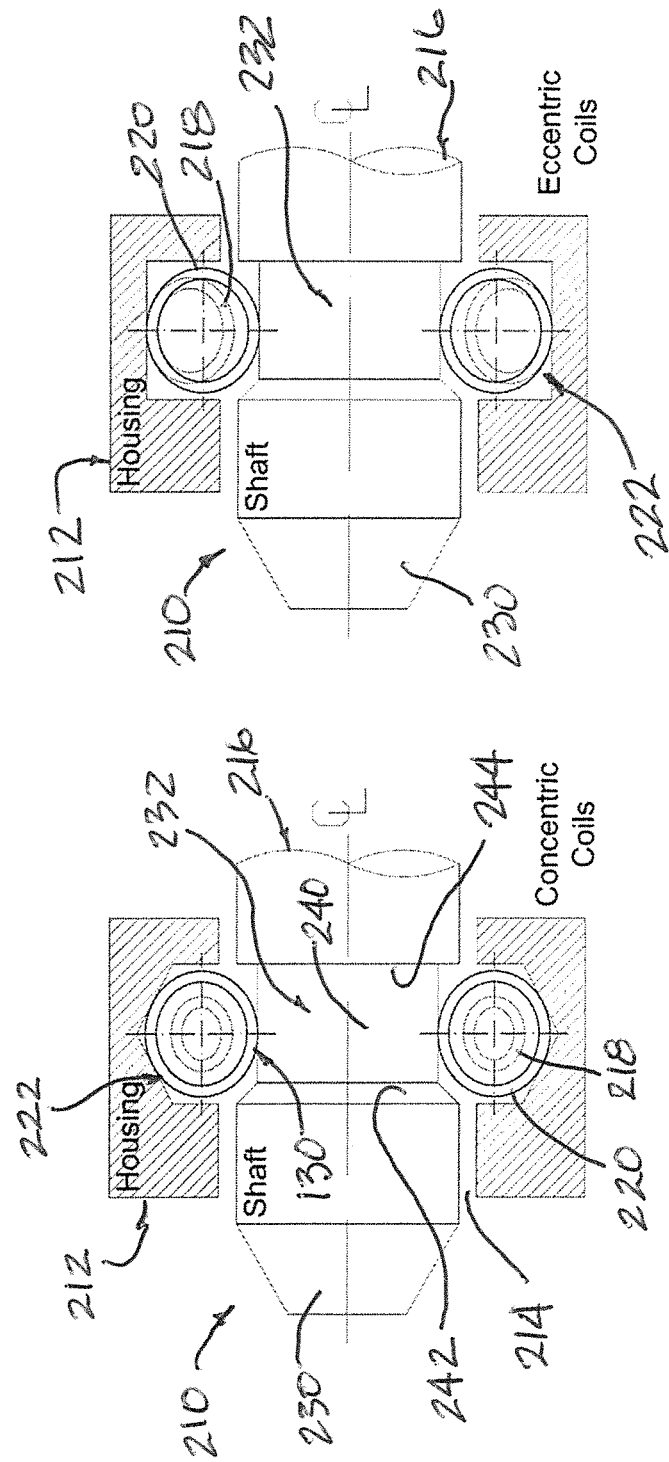

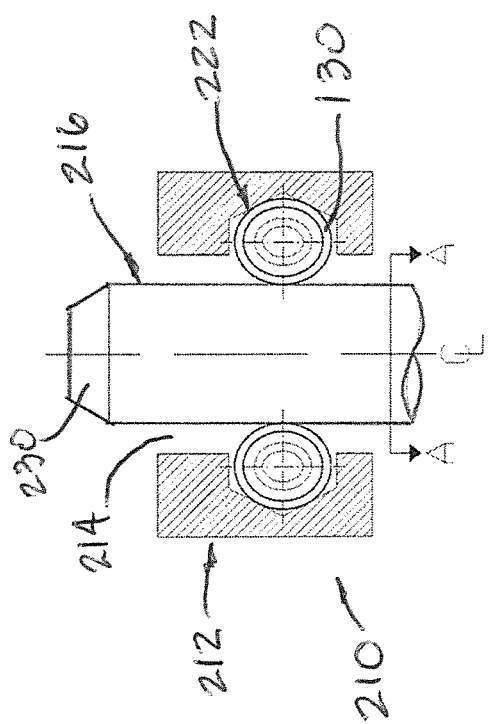
Fig. 17A
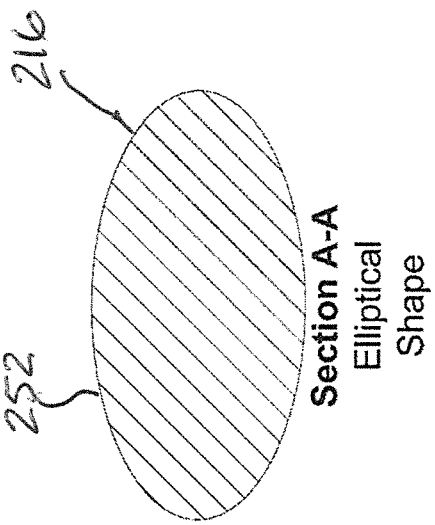
Section A-A
Elliptical Shape
Fig. 17B(2)
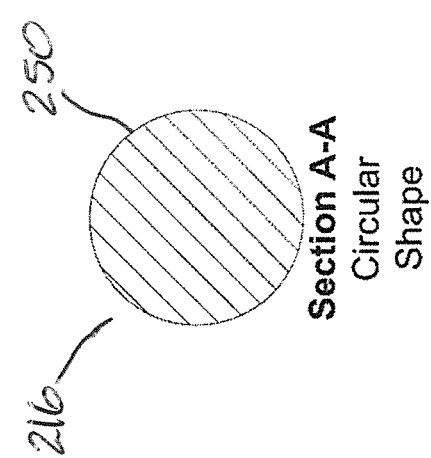
Section A-A
Circular Shape
Fig. 17B(1)

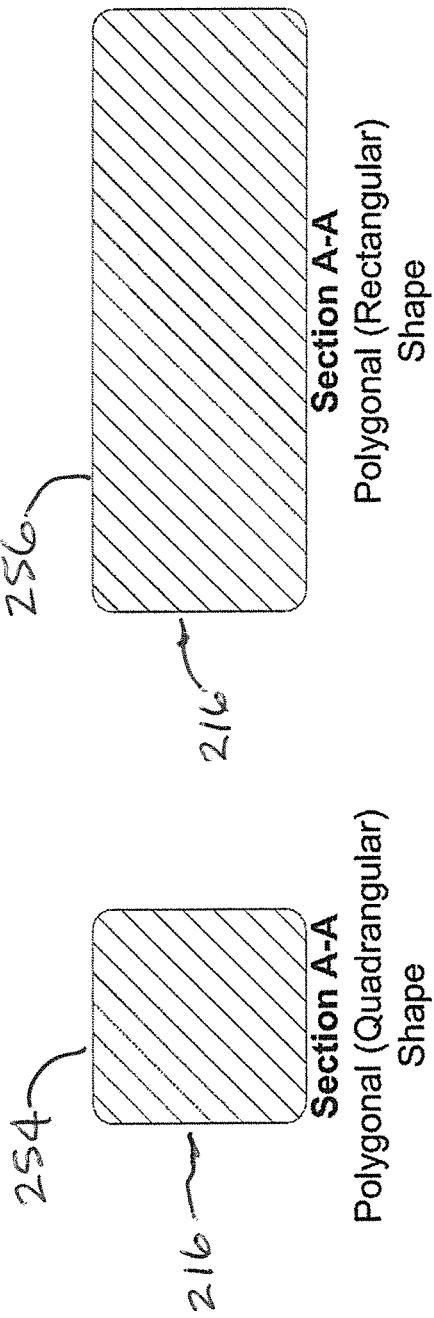
Fig. 17B(3) Section A-A Polygonal (Quadrangular) Shape
Fig. 17B(4) Section A-A Polygonal (Rectangular) Shape
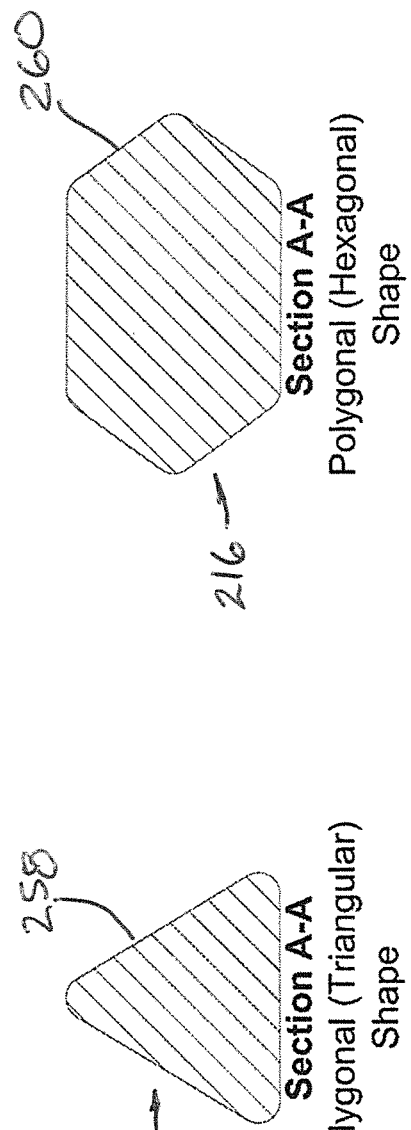
Fig. 17B(5) Section A-A Polygonal (Triangular) Shape
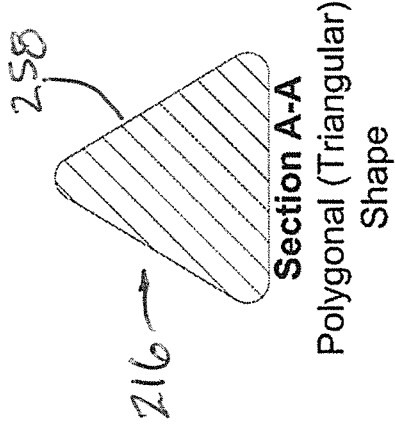
Fig. 17B(6) Section A-A Polygonal (Hexagonal) Shape

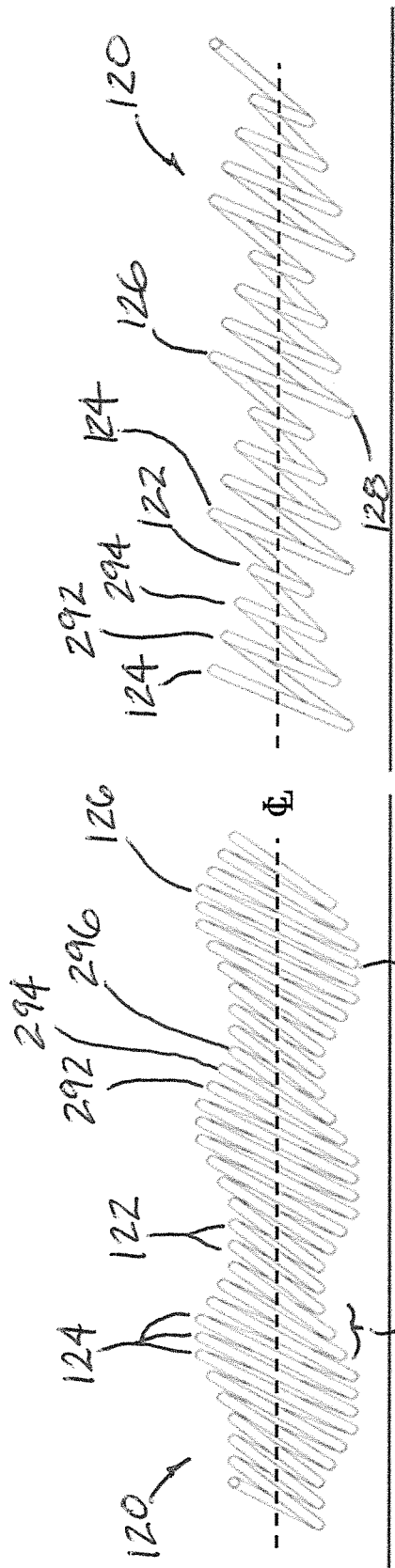
Fig. 19
Fig. 20
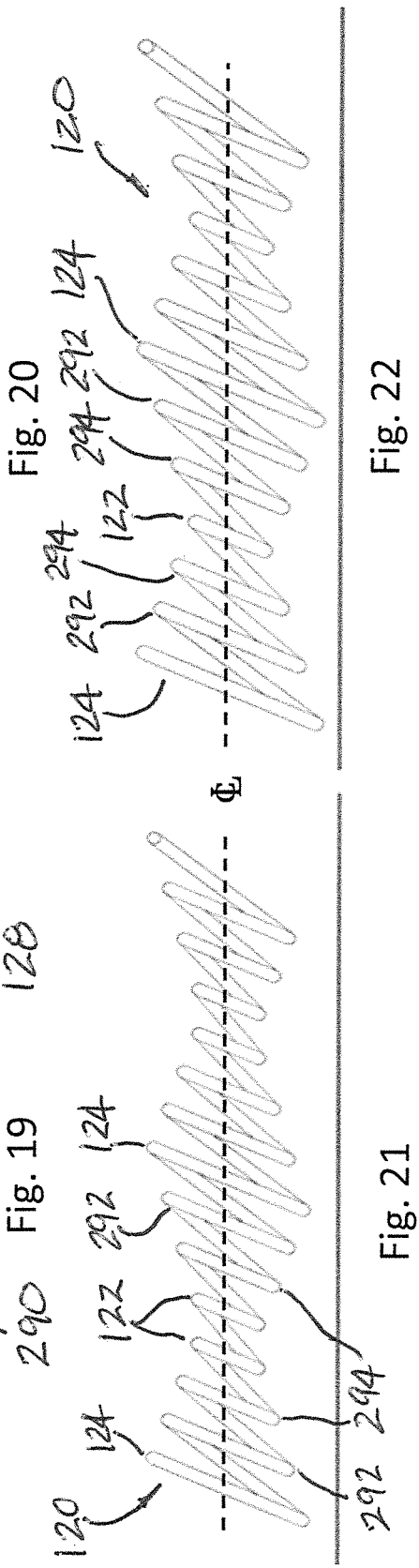
Fig. 21
Fig. 22

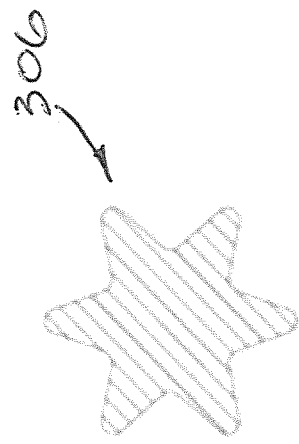
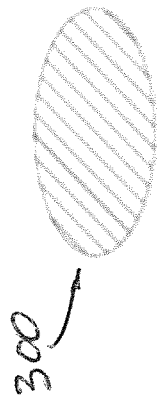
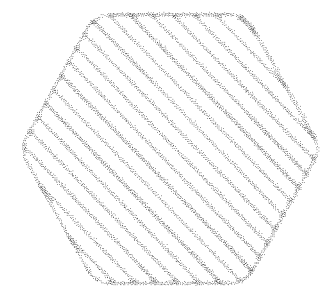
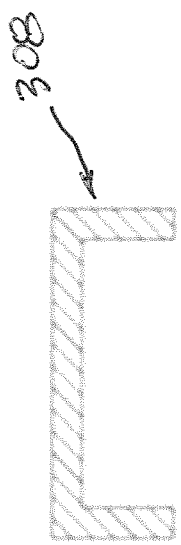
Fig. 23

CANTED COIL SPRINGS AND ASSEMBLIES AND RELATED METHODS

FIELD OF ART

The present application describes canted coil spring ring designs with coils having different dimensions and/or configurations and use of such spring rings in different applications, including in connectors having a housing and a shaft or pin and in gasket assemblies.

BACKGROUND

For canted coil springs having coils that are canted along the same direction, the spacing between the coils is a geometric parameter that may be key to the performance of a canted coil spring since it influences the tendency of the coils to butt and defines the density of coils per unit length. In certain cases, an increase in spacing between coils may be a desired solution to meet specific force and/or conductive (such as electrical or thermal) requirements. However, this increased spacing may result in losing the canted characteristics of the coils as there are fewer coils per unit length or ring diameter and thus the related benefits. In other cases, the spacing between coils as well as the wire cross section may be un-modifiable, such as due to certain minimum requirement or do to strict adherence to a, and yet the force and/or conductive properties of the canted coil spring may need to be further adjusted.

In many technology fields, there is an increased need for miniaturization of components. The field of neuro-stimulation systems is an example that manifests such need. However, as size become smaller, certain geometric parameters may be reached and further refinements are no longer possible.

SUMMARY

The present application describes canted coil spring ring designs with alternating coils with different dimensions and/or configurations in which spacing between coils is improved over similar coils with constant coil cross section.

The canted coil spring ring designs with alternating coils with different dimensions described herein may also allow for reducing at least the minimum ring inner perimeter.

Aspects of the present disclosure include a coil spring comprising a spring length having a first end and a second end. The spring has a first plurality of coils each having a first coil major axis, a first coil minor axis and a coil center defined by the intersection of said first coil major and minor axes; a first centerline defined by the plurality of coil centers resulting from said first plurality of coils, and each coil of said first plurality of coils canted along said first centerline. The spring has a second plurality of coils each having a second coil major axis, a second coil minor axis and a coil center defined by the intersection of said second coil major and minor axes; a second centerline defined by the plurality of coil centers resulting from said second plurality of coils, and each coil of said second plurality of coils canted along said second centerline. The coils of said first plurality of coils alternate with the coils of said second plurality of coils according to an alternating pattern. Wherein said first end joins said second end thereby generating a coil spring ring comprising an inner perimeter and an outer perimeter defined by at least said first plurality of coils. The resulting spring ring configuration being such that the tendency of the coils to butt is lower than the tendency of the coils to butt for a canted coil spring having a constant coil cross section made of a similar material, targeting similar conductive properties and having similar inner and outer perimeters and a similar wire cross section.

The spring ring wherein a portion of at least one coil of said second plurality of coils may move through the confines of at least one coil of said first plurality of coils under a state of deflection of said coil spring ring.

The spring ring wherein at least one coil of said first plurality of coils can be elliptical.

The spring ring wherein at least one coil of said first plurality of coils can be D shaped.

The spring ring wherein at least one coil of said first plurality of coils can have at least one portion depressed toward the interior of the coil.

A further aspect of the present disclosure is a coil spring comprising length having a first end and a second end. The coil spring comprises a first plurality of coils each having a first coil major axis, a first coil minor axis and a coil center defined by the intersection of said first coil major and minor axes; a first centerline defined by the plurality of coil centers resulting from said first plurality of coils, and each coil of said first plurality of coils canted along said first centerline. The coil spring further has a second plurality of coils each having a second coil major axis, a second coil minor axis and a coil center defined by the intersection of said second coil major and minor axes; a second centerline defined by the plurality of coil centers resulting from said second plurality of coils, and each coil of said second plurality of coils canted along said second centerline. Wherein the coils of said first plurality of coils alternate with the coils of said second plurality of coils according to an alternating pattern. Wherein said first end joins said second end, thereby generating a coil spring ring comprising: an inner perimeter and an outer perimeter, being both defined by at least said first plurality of coils; a minimum reachable inner perimeter being defined as the minimum value of said inner perimeter that can be reached without the coils having butted; said minimum reachable inner perimeter being smaller than the minimum reachable inner perimeter of a constant coil cross section canted coil spring having: a similar total number of coils and coil major and minor axes similar to those of either said first or second pluralities of coils. The coil spring with the minimum reachable inner perimeter wherein a portion of at least one coil of said second plurality of coils can move through the confines of at least one coil of said first plurality of coils under a state of deflection of said coil spring ring.

The coil spring with the minimum reachable inner perimeter, wherein at least one coil of said first plurality of coils can be elliptical.

The coil spring with the minimum reachable inner perimeter, wherein at least one coil of said first plurality of coils can be D shaped.

The coil spring with the minimum reachable inner perimeter, wherein at least one coil of said first plurality of coils can have at least one portion depressed toward the interior of the coil.

A still yet further feature of the present disclosure is a coil spring comprising a length with a first end and a second end. Said spring comprising a first plurality of coils each having a first coil major axis, a first coil minor axis and a coil center defined by the intersection of said first coil major and minor axes; a first centerline defined by the plurality of coil centers resulting from said first plurality of coils, and each coil of said first plurality of coils canted along said first centerline. Said spring further comprising a second plurality of coils each having a second coil major axis, a second coil minor axis and a coil center defined by the intersection of said second coil major and minor axes; a second centerline defined by the plurality of coil centers resulting from said second plurality of coils, and each coil of said second plurality of coils canted along said second centerline. Wherein the coils of said first plurality of coils alternate with the coils of said second plurality of coils according to an alternating pattern. Wherein said first end joins said second end to form a spring ring comprising an inner perimeter and an outer perimeter being defined by at least said first plurality of coils. The resulting configuration being such that the tendency of the coils to butt is lower than the tendency of the coils to butt for a constant coil cross section canted coil spring ring made of a similar material. The spring ring of the present disclosure can be used for electromagnetic interference shielding applications and has similar inner and outer perimeters and a similar wire cross section as the canted coil spring ring with the constant coil cross section.

The coil spring with electromagnetic interference shielding capability wherein a portion of at least one coil of said second plurality of coils can be moved through the confines of at least one coil of said first plurality of coils under a state of deflection of said coil spring ring.

The coil spring with electromagnetic interference shielding capability wherein at least one coil of said first plurality of coils can be elliptical.

The coil spring with electromagnetic interference shielding capability wherein at least one coil of said first plurality of coils can be D shaped.

The coil spring with electromagnetic interference shielding capability wherein at least one coil of said first plurality of coils can have at least one portion depressed toward the interior of the coil.

The present application is further directed to a method of achieving a coil spring ring. The method can comprise the steps of forming a first plurality of coils each having a first coil major axis, a first coil minor axis and a coil center defined by the intersection of said first coil major and minor axes; the plurality of coil centers resulting from said first plurality of coils defining a first centerline; canting each coil of said first plurality of coils along said first centerline; forming a second plurality of coils each having a second coil major axis, a second coil minor axis and a coil center defined by the intersection of said second coil major and minor axes; the plurality of coil centers resulting from said second plurality of coils defining a second centerline; canting each coil of said second plurality of coils along said second centerline; and alternating the coils of said first plurality of coils and said second plurality of coils according to an alternating pattern. The method further includes the step of joining the ends of said first and second pluralities of coils to generate a coil spring ring comprising an inner perimeter and an outer perimeter defined by at least said first plurality of coils. The spring ring has a minimum reachable inner perimeter being defined as the minimum value of said inner perimeter that can be reached without the coils having butted. Said minimum reachable inner perimeter being smaller than the minimum reachable inner perimeter of a constant coil cross section canted coil spring ring made of a similar material and having a similar total number of coils and coil major and minor axes similar to those of either said first or second pluralities of coils.

The method of achieving a coil spring ring wherein said resulting configuration can cause a portion of at least one coil of said second plurality of coils to be moved through the confines of at least one coil of said first plurality of coils under a state of deflection of said coil spring ring.

Another aspect of the present disclosure is a method of achieving a coil spring ring. The method can comprise the steps of forming a first plurality of coils each having a first coil major axis, a first coil minor axis and a coil center defined by the intersection of said first coil major and minor axes; the plurality of coil centers resulting from said first plurality of coils defining a first centerline; canting each coil of said first plurality of coils along said first centerline; forming a second plurality of coils each having a second coil major axis, a second coil minor axis and a coil center defined by the intersection of said second coil major and minor axes; the plurality of coil centers resulting from said second plurality of coils defining a second centerline; canting each coil of said second plurality of coils along said second centerline; and alternating the coils of said first plurality of coils and said second plurality of coils according to an alternating pattern. The method can further include the step of joining the ends of said first and second pluralities of coils to generate a coil spring ring comprising an inner perimeter and an outer perimeter defined by at least said first plurality of coils. The resulting configuration of the spring ring being such that the tendency of the coils to butt is lower than the tendency of the coils to butt for a constant coil cross section canted coil spring ring made of a similar material, targeting a similar electromagnetic interference shielding capacity and having similar inner and outer perimeters and a similar wire cross section.

The method of achieving a coil spring ring wherein said resulting configuration can cause a portion of at least one coil of said second plurality of coils to be moved through the confines of at least one coil of said first plurality of coils under a state of deflection of said coil spring ring.

A still unique feature of the present disclosure is an assembly comprising a housing defining a bore; a groove along the inner surface of said housing being defined by multiple surfaces; a shaft; and a coil spring ring of one of the embodiments disclosed herein installed within said groove and contacting at least one of said multiple surfaces defining said groove. The insertion of said shaft into said bore causing said coil spring ring to deflect; such deflection engaging both said shaft and said housing.

A still unique feature of the present disclosure is an assembly comprising a housing defining a bore; a shaft; a groove along the outer surface of said shaft being defined by multiple surfaces; a coil spring ring of one of the embodiments disclosed herein installed within said groove and contacting at least one of said multiple surfaces defining said groove; the insertion of said shaft into said bore causing said coil spring ring to deflect; such deflection engaging both said shaft and said housing.

A still yet further feature of the present disclosure is an assembly comprising a housing defining a bore; a first groove along the inner surface of said housing being defined by a first set of surfaces; a shaft; a second groove along the outer surface of said shaft being defined by a second set of surfaces; said shaft inserted into said housing; said first and second grooves aligned so that they define a cavity; the coil spring ring of one of the embodiments disclosed herein placed into said cavity, contacting at least one surface of said first set of surfaces and at least one surface of said second set of surfaces.

The present application is further directed to a gasket assembly. The gasket assembly can comprise a coil spring ring of one of the embodiments disclosed herein; a groove receiving said coil spring ring and being defined by multiple surfaces; the arrangement of said multiple surfaces enabling the loading of said coil spring ring in a selected direction.

The application still further includes a canted coil spring ring comprising a first plurality of coils each having a first coil major axis, a first coil minor axis and a coil center defined by the intersection of said first coil major and minor axes; a first centerline defined by the plurality of coil centers resulting from said first plurality of coils, and each coil of said first plurality of coils canted along said first centerline; a second plurality of coils each having a second coil major axis, a second coil minor axis and a coil center defined by the intersection of said second coil major and minor axes; a second centerline defined by the plurality of coil centers resulting from said second plurality of coils, and each coil of said second plurality of coils canted along said second centerline; wherein the coils of said first plurality of coils alternate with the coils of said second plurality of coils according to an alternating pattern; and wherein spring ring comprises an inner perimeter defined by said first plurality of coils only.

The coil spring ring wherein a portion of at least one coil of said second plurality of coils can be moved through at least one coil of said first plurality of coils under a state of deflection of said coil spring ring.

The coil spring ring wherein at least one coil of said first plurality of coils can be elliptical.

The coil spring ring wherein at least one coil of said first plurality of coils can be D shaped.

The coil spring ring wherein at least one coil of said first plurality of coils can have at least one portion depressed toward the interior of the coil.

The coil spring ring wherein the alternating pattern can comprise a coil from the first plurality of coils positioned next to a coil from the second plurality of coils and then repeating the alternating pattern.

The coil spring ring wherein the alternating pattern can comprise a coil from the first plurality of coils positioned next to two or more coils from the second plurality of coils and then repeating the alternating pattern.

The coil spring ring can further comprise a third plurality of coils each having a first coil major axis, a first coil minor axis and a coil center defined by the intersection of said first coil major and minor axes; a first centerline defined by the plurality of coil centers resulting from said first plurality of coils, and each coil of said third plurality of coils canted along said first centerline.

The coil spring ring wherein a coil of the third plurality of coils can be located between at least one coil of the first plurality of coils and at least one coil of the second plurality of coils.

A still yet further feature of the present disclosure is a method of forming a canted coil spring ring. The method can comprise the steps forming a first plurality of coils each having a first coil major axis, a first coil minor axis and a coil center defined by the intersection of said first coil major and minor axes; the plurality of coil centers resulting from said first plurality of coils defining a first centerline; canting each coil of said first plurality of coils along said first centerline; forming a second plurality of coils each having a second coil major axis, a second coil minor axis and a coil center defined by the intersection of said second coil major and minor axes; the plurality of coil centers resulting from said second plurality of coils defining a second centerline; canting each coil of said second plurality of coils along said second centerline; joining the ends of said first and second pluralities of coils to generate a coil spring ring comprising an inner perimeter and an outer perimeter with the inner perimeter defined by said first plurality of coils only; and wherein the coils of said first plurality of coils and said second plurality of coils are alternated according to an alternating pattern.

The method wherein said resulting configuration can cause a portion of at least one coil of said second plurality of coils to move through at least one coil of said first plurality of coils under a state of deflection of said coil spring ring.

The method can further comprise placing said spring ring inside a bore of a housing and inserting a pin through a center of the spring ring.

The method wherein the housing has a housing groove, the pin has a pin groove or the housing and the pin can each have a groove.

The method wherein the housing groove can be a V-groove.

The method can further comprise forming the first plurality of coils from a wire cross-section having a circular shape, an elliptical shape, a flat rectangular shape, a square shape, a polygonal shape, a star shape, or a U-shape.

The present application is further directed to a coil spring ring comprising a first plurality of coils each having a first coil major axis, a first coil minor axis and a coil center defined by the intersection of said first coil major and minor axes; a first centerline defined by the plurality of coil centers resulting from said first plurality of coils, and each coil of said first plurality of coils canted along said first centerline; and a second plurality of coils each having a second coil major axis, a second coil minor axis and a coil center defined by the intersection of said second coil major and minor axes; a second centerline defined by the plurality of coil centers resulting from said second plurality of coils, and each coil of said second plurality of coils canted along said second centerline. The spring ring has an outer perimeter defined by at least said first plurality of coils and an inner perimeter defined by said first plurality of coils only; said inner perimeter having a minimum reachable inner perimeter, which is defined as a minimum value that can be reached without the first plurality of coils having butted. Said minimum reachable inner perimeter can be smaller than a minimum reachable inner perimeter of a constant coil cross section canted coil spring having a similar total number of coils and coil major and minor axes similar to those of either said first or second pluralities of coils; and wherein the coils of said first plurality of coils alternate with the coils of said second plurality of coils according to an alternating pattern.

The coil spring ring wherein a portion of at least one coil of said second plurality of coils can move through at least one coil of said first plurality of coils under a state of deflection of said coil spring ring.

The coil spring ring wherein at least one coil of said first plurality of coils can be elliptical.

The coil spring ring wherein at least one coil of said first plurality of coils can be D shaped.

BRIEF DESCRIPTION OF DRAWINGS

These and other features and advantages of the present device, system, and method will become appreciated as the same becomes better understood with reference to the specification, claims and appended drawings wherein:

The coil spring rings illustrated in the figures and described below are generally circular and resembles a garter or circular shaped rings having ends that are joined by any number of means. Thus, they comprise a ring inner diameter and a ring outer diameter. However, non-circular coil spring rings may be considered as well, such as square, rectangular or oval. For such non-circular coil spring rings, it may be less precise to refer to their ring inner and outer dimensions as diameters. Thus, unless the context indicates otherwise, the broader terms ring inner perimeter and ring outer perimeter are used when referring to coil spring rings, of both non-circular and circular configurations, and to their inside dimension or boundary and outside dimension or boundary. Further, where the coils are undulating, such as having larger coils dispersed with relatively smaller coils, the inner and outer perimeters of the spring ring are understood to mean the inner most or outer most perimeter defined by the coil projections along the inner and outer regions of the spring ring. For example, if the spring ring has coils with undulating surfaces along an inner perimeter, such as having smaller coils disposed and recessed between larger coils, the smallest most coil projections formed by the larger coils will be considered as defining the inner perimeter.

FIG. 1A shows a side view and an isometric view of a canted coil spring length. FIG. 1B illustrates a canted coil spring ring in side view and isometric view that can be formed from the canted coil spring length of FIG. 1A. FIG. 1C shows the butted configuration of the same canted coil spring ring.

FIG. 2A shows a side view and an isometric view of a canted coil spring length in accordance with an alternative embodiment. FIG. 2B shows a canted coil spring ring in side view and isometric view with alternating smaller and larger coils that can be formed from the canted coil spring length of FIG. 2A. FIG. 2C shows the butted configuration of the same canted coil spring ring.

FIG. 3A shows a side view and an isometric view of a canted coil spring length in accordance with another alternative embodiment. FIG. 3B shows a canted coil spring ring in side view and isometric view with alternating smaller and larger coils that can be formed from the canted coil spring length of FIG. 3A. FIG. 3C shows the butted configuration of the same canted coil spring ring.

FIG. 5A shows a side view and an isometric view of a canted coil spring length in accordance with another alternative embodiment. FIG. 5B shows a canted coil spring ring in side view and isometric view with alternating smaller and larger coils that can be formed from the canted coil spring length FIG. 5A. A butted configuration of the same canted coil spring ring may also be employed (not shown).

FIG. 6A shows a side view and an isometric view of a canted coil spring length in accordance with another alternative embodiment. FIG. 6B shows a canted coil spring ring in side view and isometric view with alternating smaller and larger coils that can be formed from the canted coil spring length of FIG. 6A. A butted configuration of the same canted coil spring ring may also be employed (not shown).

FIG. 8A shows a side view and an isometric view of a canted coil spring length in accordance with another alternative embodiment. FIG. 8B shows a canted coil spring ring in side view and isometric view with alternating smaller and larger coils that can be formed from the canted coil spring length of FIG. 8A. A butted configuration of the same canted coil spring ring may also be employed (not shown).

FIG. 12A illustrates a canted coil spring length with alternating smaller and larger coils in a side view and an isometric view and FIG. 12B illustrates a helical spring length with alternating smaller and larger coils also in a side view and an isometric view.

FIG. 13A illustrates an alternative canted coil spring length with alternating smaller and larger coils in a side view and an isometric view and FIG. 13B illustrates an alternative helical spring length with alternating smaller and larger coils also in a side view and an isometric view.

FIG. 14A illustrates an alternative canted coil spring length with alternating smaller, medium and larger coils in a side view and an isometric view and FIG. 14B illustrates an alternative helical spring length with alternating smaller, medium and larger coils also in a side view and an isometric view.

FIGS. 15A-15L show various canted coil spring rings each having particular coil cross sections and inner and outer perimeters.

FIGS. 16A-16F illustrate various assemblies each comprising a housing defining a bore, a shaft inserted in such bore and a canted coil spring ring engaging both the housing and the shaft.

FIG. 17A and FIGS. 17B(1)-17B(6) show various shaft cross sections that are usable with different spring ring configurations.

FIGS. 19 to 22 show canted coil springs having more than two coil sizes that alternate with each other according to an alternating pattern.

FIG. 23 shows various wire cross sections that may be used to form the canted coil spring lengths for making the canted coil spring ring disclosed in the present application.

DETAILED DESCRIPTION OF THE ILLUSTRATED EMBODIMENTS

Figure 4A:
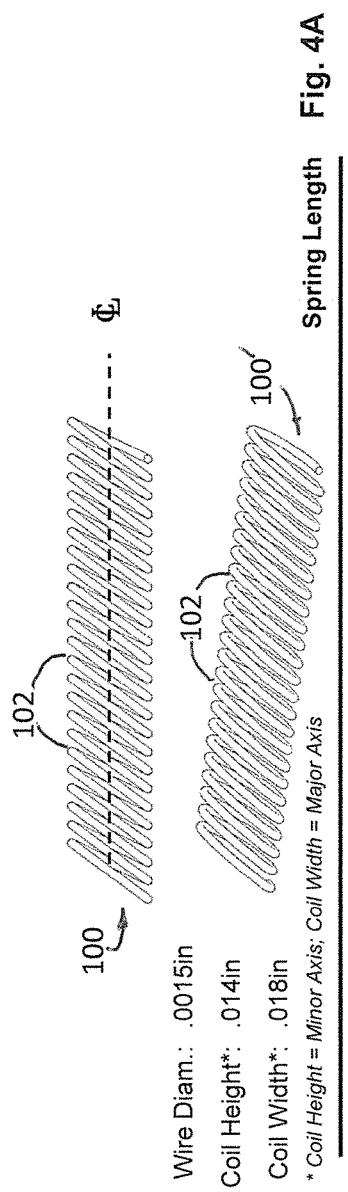
FIG. 4A shows a side view and an isometric view of a canted coil spring length in accordance with another alternative embodiment.

The detailed description set forth below in connection with the appended drawings is intended as a description of the presently preferred embodiments of canted coil spring ring designs with coils having different dimensions and/or configurations and use of such spring rings in different applications provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

With reference now to FIG. 1A, a side view 100 and an isometric view 100' of a constant coil cross section canted coil spring length with a plurality of coils 102 is shown. The spring length 100, 100' may be coiled from a wire and each coil can be coiled with a coil height or minor axis and a coil width or major axis. In the embodiment shown, a wire diameter of 0.0015 inch ("in"), a coil height of 0.007 in and a coil width of 0.009 in are shown. These dimensions are exemplary only.

FIG. 1B shows a side view 110 and an isometric view 110' of a canted coil spring ring generated from the canted coil spring length 100, 100' illustrated in FIG. 1A with a ring inner perimeter 112 and a ring outer perimeter 114. In the embodiment shown, the ring inner perimeter 112 is about 0.020 in. Further, as the spring ring 110, 110' of FIG. 1B is substantially circular in configuration, the inner and outer perimeters may also be referred to as inner and outer diameters, respectively.

FIG. 1C shows a side view 110 and an isometric view 110' of the same canted coil spring ring in its butted configuration in which the coils 102 along the inside perimeter 112 contact. In the embodiment shown, the inside perimeter is about 0.012 in when the coils form a butted ring inner diameter.

For discussion purposes, it is hereinafter assumed that the canted coil spring shown in FIG. 1A is the smallest constant coil cross section canted coil spring that can be made given the current industry manufacturing capabilities. Therefore its coil height-to-wire diameter ratio (CH/θ), the spacing between the coils, and the wire diameter are considered to be the minimum feasible values. As further discussed below, canted coil spring lengths may be adjusted by changing the coils' configurations to enable further manipulation of the various spring ring parameters.

FIG. 2A illustrates a side view 120 and an isometric view 120' of a canted coil spring length with alternating smaller coils 122 and relatively larger coils 124 being concentric to each other when viewed in the direction of the spring centerline Ł. In other words, the smaller coils 122 are recessed from the first edge or first side edge 126 and from the second edge or second side edge 128 of the larger coils 124. In the embodiment shown, the wire diameter is about 0.0015 in, the coil heights are about 0.007 in and about 0.014 in for the smaller 122 and larger 124 coils, respectively, and the coil widths are about 0.009 in and about 0.018 in for the smaller and larger coils, respectively. In the present embodiment, the dimensions of the smaller coils 122 are the same as the dimensions of the coils 102 of the canted coil spring length 120, 120' shown in FIG. 1A and that the spacing between the smaller and larger coils is about the same as the spacing between coils 102 of such canted coil spring length shown in FIG. 1A.

FIG. 2B shows a side view 130 and an isometric view 130' of a canted coil spring ring generated from the canted coil spring length 120, 120' illustrated in FIG. 2A with a ring inner perimeter 112, such as inside diameter, of about 0.013 in. In the present embodiment, the ring inner perimeter is smaller than the ring inner perimeter of the canted coil spring ring shown in FIG. 1B. However, the ring outer diameter is larger. The relatively smaller inner perimeter 112, 112' of FIG. 2B is made possible by decreasing in the coil density stacked along the inner perimeter 112, 112' to provide greater spacing for forming a relatively tighter spring ring. However, the number of coils 122, 124 per spring length for the embodiment of FIG. 2A compared to the number of coils 102 per spring length of FIG. 1A may remain or be the same. As further discussed below, while the number of coils of the present disclosure is kept generally the same as the constant coil cross section canted coil spring length of FIG. 1A, the improved spacing is provided by alternating the coils along the inner perimeter to provide greater spacing and therefore better flexibility in rolling the spring length into a tighter shape to form a spring ring.

In the embodiment as shown, the spacing or lower density along the inner perimeter 112 is made possible by providing the coil length 120, 120' with alternating smaller coils 122 and relatively larger coils 124. Upon joining the two ends, which includes a first end and a second end, of the spring length 120, 120', the smaller coils 122 are each spaced from the inner perimeter 112, 112' of the spring ring 130, 130' by a gap 132. The ends may be joined by welding, using a snap-fit arrangement, using threads, or any known means.

FIG. 2C shows a side view 130 and an isometric view 130' of the same canted coil spring ring of FIG. 2B in its butted configuration, which is understood to mean a configuration in which two or more coils contact one another along the inner perimeter of the spring ring. As shown, the butted ring inner perimeter is about 0.006 in and the smaller coils 122 crossing and being surrounded by the butted larger coils 124. Note that the butted ring inner perimeter 112 is smaller than the butted ring inner perimeter 112 of the canted coil spring ring shown in FIG. 1C. The butted ring outer perimeter 114 is larger.

The coil length 120 and the spring ring 130 formed from said length therefor has a first plurality of coils 124 each having a first coil major axis, a first coil minor axis, and a coil center defined by the intersection of said first coil major and minor axes and a first centerline defined by the plurality of coil centers resulting from said first plurality of coils 124. Each coil of said first plurality of coils canted along said first centerline, as shown in FIG. 2A. The coil length 120 and the spring ring 130 are further understood to include a second plurality of coils 122 each having a second coil major axis, a second coil minor axis, and a coil center defined by the intersection of said second coil major and minor axes and a second centerline defined by the plurality of coil centers resulting from said second plurality of coils. Each coil of said second plurality of coils 122 canted along said second centerline. Wherein the coils of said first plurality of coils 124 alternate with the coils of said second plurality of coils 122 according to an alternating pattern. The alternating pattern can vary in coil types, as further discussed below with reference to other coil length and spring ring embodiments.

With reference specifically to FIGS. 2B and 2C, the coil spring ring comprises an inner perimeter 112 and an outer perimeter 114, which are defined by at least said first plurality of coils 124. In other examples where other coils types align with the first plurality of coils 124 along the outer perimeter 114, then the outer perimeter 114 may be defined by the other coils in addition to the first plurality of coils 124. The resulting configuration being such that the tendency of the coils 122, 124 to butt is lower than the tendency of the coils 102 to butt of a constant coil cross section canted coil spring ring 110 (FIG. 1B) made of a similar material, targeting similar conductive properties, and having similar inner and outer perimeters and a similar wire cross section.

As shown in FIGS. 2B and 2C, the inner perimeter 112 has a minimum reachable inner perimeter dimension or value being defined as the minimum value of said inner perimeter that can be reached without the coils having butted, which is smaller than 0.013 in and greater than 0.006 in. By spacing the coils at the inner perimeter 112, such as alternating the coils with different sizes along the inner perimeter, the minimum reachable inner perimeter is smaller than the minimum reachable inner perimeter of a constant coil cross section canted coil spring 110 (FIGS. 1B and 1C) having a similar total number of coils and coil major and minor axes similar to those of either said first or second pluralities of coils.

Further, the resulting configuration of the present spring ring 130 is such that the tendency of the coils to butt is lower than the tendency of the coils of a constant coil cross section canted coil spring ring 110 (FIG. 2C) made of a similar material, targeting a similar electromagnetic interference shielding capacity and having similar inner and outer perimeters and a similar wire cross section, to butt.

A still yet further aspect of the present disclosure is a method for producing a canted coil spring ring with optimal inner perimeter dimension or value. The method comprises forming a spring length with a plurality of coils and canting the coils along a same direction form canted coils and wherein the canted coils include a plurality of at least two coil types, including a plurality of a first coil type and a plurality of a second coil type. A coil type is understood to refer to either a particular shaped coil, such as being D-shaped or elliptical shaped, and/or to two similar shapes but different coil dimensions, such as different coil heights and coil widths. Connecting the two free ends of the coil length to form a canted coil spring ring having an inner perimeter and an outer perimeter and wherein the inner perimeter is defined by less than the total number of coils that form the spring ring. For example, if the spring ring has thirty five total canted coils, then the inner perimeter is defined by fewer than thirty five coils that align along the inner perimeter. In an embodiment and assuming the second coil type is recessed from the inner perimeter by a gap, only the first coil type is aligned along the inner perimeter. In another example, a third coil type or a fourth coil type or both but not the second coil type is or are aligned with the first coil type to define the inner perimeter. The resultant spring ring will have a minimum reachable inner perimeter being defined as the minimum value of said inner perimeter that can be reached without the coils having butted and wherein said minimum reachable inner perimeter is smaller than the minimum reachable inner perimeter of a constant coil cross section canted coil spring ring made of a similar material and having a similar total number of coils and coil major and minor axes similar to those of either said first or second pluralities of coils.

As further discussed below, other alternative canted coil spring lengths and spring rings formed by such spring lengths have similar characteristics and advantages as described herein-above, due at least in part by spacing the inner perimeter to enable the canted coil spring lengths to form spring rings with smaller minimum inner perimeter without butting than comparable spring lengths with the same wire diameter, wire material, and coil density per unit length.

Thus, the embodiment illustrated in FIGS. 2B and 2C allows for at least a smaller ring inner perimeter compared to a spring length having similar coil dimensions without requiring a smaller coil height to wire diameter ratio, a smaller spacing between the coils, i.e., lower coil density per unit length, or a smaller wire diameter. Said differently, for two different spring coil lengths having at least some similarly sized spring coils made from similar wire diameter and having similar coil height or coil width or both, the present spring ring can have a smaller inner perimeter than prior art spring ring formed from a similar spring length but with all similarly sized and shaped coils. The present spring ring may be used with ever smaller pin, shaft, or rod outer diameter than previously possible by having a smaller inner perimeter. In a particular example, the present spring ring has spring coils that alternate between smaller coils and relatively larger coils. The different sized coils allow the coil spacing along the inner perimeter to be spaced to permit a tighter radius. Additionally, the performance of the present canted coil spring ring mounted in or on a shaft having a diameter equal to the ring inner perimeter may be less sensible to the shaft tolerances because such shaft tolerances represent a smaller percentage of the larger coils as the larger coils have a wider working range of deflection.

Thus, an aspect of the present disclosure is understood to include a spring length having two ends and a plurality of coils of a first coil height and width and a plurality of coils having a second coil height and width, which are smaller than the first coil height and width, and wherein the spring length defines a spring ring having an inner perimeter when two ends are joined and wherein the inner perimeter is defined by the plurality of coils of the first coil height and coil width only. In a particular example, the plurality of coils of the second coil height and coil width are each recessed from the inner perimeter by a gap. In still yet another example, the plurality of coils of the second coil height and coil width are recessed from an outer perimeter by a gap. The present spring ring is also understood to include a plurality of coils of the second coil height and coil width that are recessed along the inner perimeter by a gap and the outer perimeter by a gap. In some examples, the two gaps are about the same. In other examples, the gap along the outer perimeter is smaller than the gap along the inner perimeter. In other examples, the gap differences are reversed.

Wire types usable here in include copper, copper alloy, aluminum, aluminum alloy, gold, gold alloy, silver, silver alloy, brass, and brass alloy. Additional wires include steel material, such as medical grade stainless steel, titanium, noble metals such as platinum or conventional implantable grade materials with noble metal coatings, such as platinum over stainless steel. The wire may also be a multi-metallic wire in which a base core material is surrounded by one or more other materials. In some examples, the spring has an inner core and an outer layer having different material compositions with the outer layer comprising at least one of platinum, iridium, rhodium, rhenium, ruthenium and palladium. The outer layer should have sufficient thickness to provide the spring with an electrical resistance that is within 20% or less of a spring made entirely of at least one of platinum, iridium, rhodium, rhenium, ruthenium and palladium. For electrical connector applications, the spring may be used with a housing and a pin or shaft made from stainless steel type 316L, MP35N, platinum-iridium, titanium or other conductive materials.

FIG. 3A illustrates a side view 120 and an isometric 120' view of a canted coil spring length having a plurality of coils that alternate between smaller coils 122 and larger coils 124.

In the present embodiment, the smaller coils and the larger coils are not concentric to each other but are displaced relative to one another when viewed in the direction of the spring centerline Ł. As shown, the smaller coils 122 are aligned along the first edge 126 with the larger coils 124 but are recessed from the second edge 128 by a gap 132.

In one example, the spring length 120, 120' is made from a wire diameter of about 0.0015 in and the coils have coil heights of 0.007 in and 0.011 in for the smaller coils and the larger coils, respectively, and coil widths of 0.009 in and 0.013 in for the smaller coils and the larger coils, respectively. As indicated, the dimensions of the smaller coils 122 are the same as the dimensions of the coils 102 of the canted coil spring length 100, 100' shown in FIG. 1A and the spacing between the smaller coils 122 and the larger coils 124 of FIG. 3A is the same as the spacing between coils 102 of such canted coil spring length shown in FIG. 1A. Although this typically implies the same inner perimeter size as that of the spring ring of FIG. 1B when the spring length is connected end-to-end to from a garter shaped spring, in the present embodiment, the inner perimeter can be made smaller relative to the spring ring of FIG. 1B. As disclosed, the inner perimeter coil spacing, such as coil density along the inner perimeter, may be adjusted to allow for forming a relatively smaller inner perimeter. In one example, the inner perimeter coil spacing may be controlled by alternating the coils between smaller coils and relatively larger coils so that at the inner perimeter more of the larger coils are positioned than the smaller coils to enable the desired spacing and curving, such as bending of the spring length, to form the spring ring with a relatively smaller inner perimeter dimension.

FIG. 3B shows a side view 130 and an isometric view 130' of a canted coil spring ring formed by connecting the ends of the canted coil spring length 120, 120' illustrated in FIG. 3A. The formed spring ring 130, 130' has a ring inner diameter or dimension of 0.013 in. In the present embodiment, the ring inner perimeter 112, 112' is smaller than the ring inner perimeter 112, 112' of the canted coil spring ring 110, 110' shown in FIG. 1B. However, the ring outer perimeter 114, 114' remains about the same. Similar to the embodiment of FIGS. 2A-2C, the smaller inner perimeter 112, 112' is made possible by decreasing the coil density stacked along the inner perimeter although the number of coils per spring length may remain or be the same as that shown in FIG. 1A.

FIG. 3C shows a side view 130 and an isometric view 130' of the same canted coil spring ring of FIG. 3B in its butted configuration, which is understood to mean a configuration in which two or more coils contact one another along the inner perimeter 112 of the spring ring. As shown, the butted ring inner perimeter is about 0.006 in and the smaller coils 122 crossing and being surrounded by the butted larger coils 124. Note that the butted ring inner perimeter is smaller than the butted ring inner perimeter of the canted coil spring ring shown in FIG. 1C. However, the butted ring outer perimeter 114, 114' is slightly larger than the spring ring of FIG. 1C.

Therefore the embodiment illustrated in FIGS. 3B and 3C allows for at least a smaller ring inner perimeter requiring neither a smaller coil height to wire diameter ratio, a smaller spacing between coils, or a smaller wire diameter. Furthermore, the performance of such or a similar canted coil spring ring mounted on a shaft having a diameter equal to the ring inner perimeter may be less sensible to the shaft tolerances because of such shaft tolerances representing a smaller percentage of the larger coils. Said differently, by utilizing a spring length with coil dimensions, such as coil height and coil width, larger than that of FIG. 1A yet still provide for use with a similar pin or shaft diameter or even smaller diameter than that usable with the spring ring of FIG. 1C, the present spring ring is less affected by shaft tolerances since the larger coils have a larger range of working deflection. This is known in the canted coil spring technology area as a generally constant force over a large spring deflection range, similar to that described in U.S. Pat. No. 4,655,462, the contents of which are expressly incorporated herein by reference.

In one example, alternating smaller and larger coils for a canted coil spring ring may also be used to provide an improved electromagnetic interference shielding capacity. For example, the spring rings of FIGS. 2B, 2C, 3B and 3C are believed to provide improved electromagnetic interference shielding capacity. Note that a constant coil cross section canted coil spring ring complying with certain geometric and material requirements may be crowded with additional smaller coils and still comply with the same requirements; adding such additional smaller coils is expected to improve the electromagnetic interference shielding capacity of the canted coil spring ring.

Thus, an aspect of the present disclosure is understood to include a spring length having two ends, including a first end and a second end, and a plurality of coils of a first coil height and width and a plurality of coils having a second coil height and width, which are smaller than the first coil height and width, and wherein the spring length defines a spring ring having an inner perimeter when two ends are joined and wherein the inner perimeter is defined by the plurality of coils of the first coil height and coil width only. In a particular example, the plurality of coils of the second coil height and coil width are recessed from the inner perimeter by a gap. In still yet another example, the plurality of coils of the second coil height and coil width are aligned with the plurality of coils of the first coil height and coil width along an outer perimeter 114. The present spring ring is also understood to include a plurality of coils of the second coil height and coil width that are recessed along the inner perimeter by a gap but generally aligned with the plurality of coils of the first coil height and coil width along an outer perimeter 114.

Figure 4B:
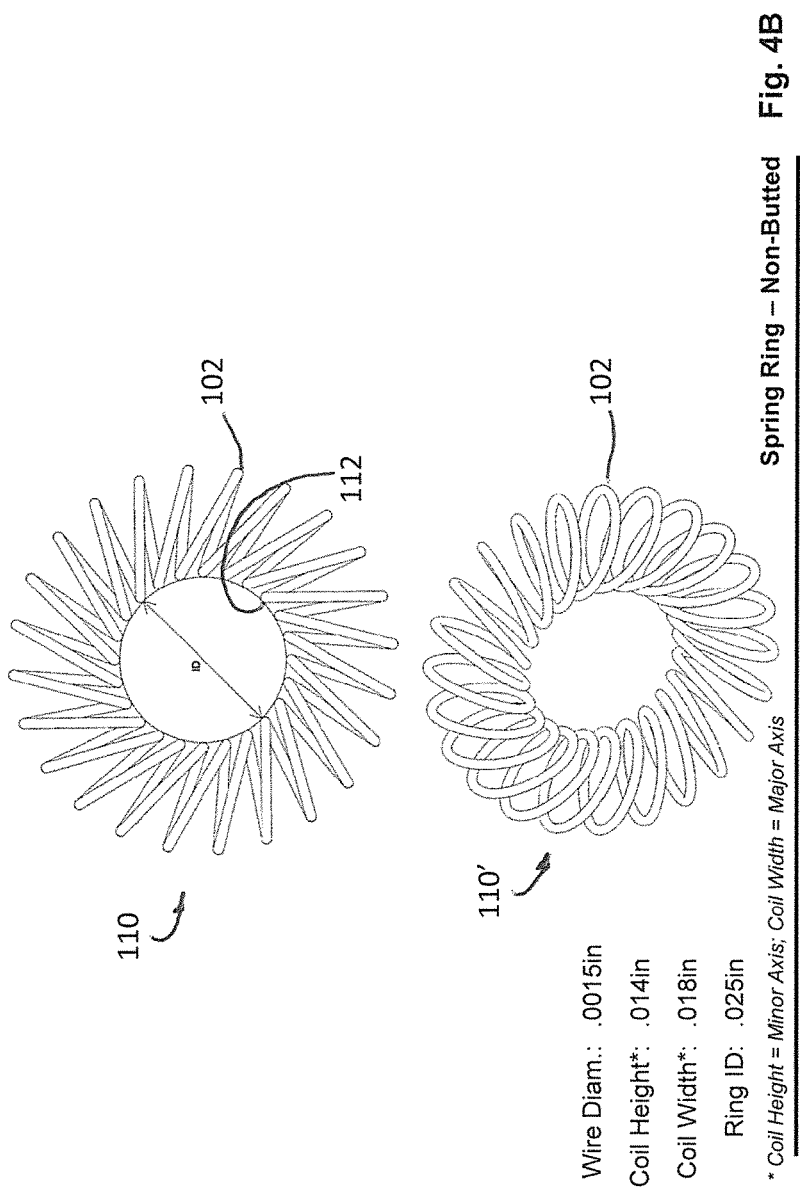
FIG. 4B illustrates a canted coil spring ring in side view and isometric view that can be formed from the canted coil spring length of FIG. 4A. A butted configuration of the same canted coil spring ring may also be employed (not shown).

FIG. 4A illustrates a side view 100 and an isometric view 100 of a constant coil cross section canted coil spring length with a wire diameter of 0.0015 in, similar to that of FIG. 1A, a coil height of 0.014 in and a coil width of 0.018 in. FIG. 4B shows a side view 110 and an isometric view 110' of a canted coil spring ring generated from the canted coil spring length illustrated in FIG. 4A, such as by joining the two free ends to form the ring using any number of means, including welding, threading, or other mechanical engagement such as snap-fitting. The ring inner perimeter 112 of the spring ring is 0.025 in.

FIG. 5A illustrates a side view 120 and an isometric view 120' of a canted coil spring length with alternating smaller coils 122 and larger coils 124 being concentric to each other when viewed in the direction of the spring centerline Ł. As shown, the spring length is made from a wire diameter of 0.0015 in, coil heights of 0.007 in for the smaller coils 122 and 0.014 in for the larger coils and coil widths of 0.009 in for the smaller coils 122 and 0.018 in for the larger coils. Note that the dimensions of the larger coils are the same as the dimensions of the coils of the canted coil spring length 100 shown in FIG. 4A and the spacing between the smaller and larger coils 122, 124 is the same as the spacing between coils 102 of the spring length 100 shown in FIG. 4A.

FIG. 5B shows a side view 130 and an isometric view 130' of a canted coil spring ring generated from the canted coil spring length 120 illustrated in FIG. 5A, such as by joining the two free ends of the spring length. The present spring ring 130, 130' has a ring inner perimeter of 0.025 in. The present ring inner perimeter and the ring outer perimeter are the same as those of the canted coil spring ring 110 shown in FIG. 4B.

The butting of the coils of the canted coil spring rings illustrated and described in the present application generally begins at the ring inner perimeter. In view of this understanding, it is reasonable to: (1) define effective spacing between coils to refer to the spacing between those coils that describe or define the ring inner perimeter 112; and (2) conclude that the tendency of the coils to butt, such as to contact, is influenced by the effective spacing between coils. As described elsewhere herein, the present device, system, and method are directed to a spring ring having comparable coil spacing as prior art spring ring, such as comparable number of coils for a given coil length, but wherein the inner perimeter has improved spacing by recessing some of the coils from the inner perimeter to provide for fewer coils along the inner perimeter, but not coil density, such as total number of coils, for a given length.

The effective spacing between coils of the canted coil spring ring shown in FIG. 5B doubles the effective spacing between coils of the canted coil spring ring shown in FIG. 4B at the inner perimeter 112, thus the tendency for the coils of FIG. 5B to butt is reduced. In order for the spacing of the spring ring 110 of FIG. 4B to increase, for example to have more space between the coils at the inner perimeter, in order to have the same or similar reduced tendency for the coils to butt, the spring ring 110 of FIG. 4B would need to reduce the number of coils per spring length, which would result in losing the canted configuration of its coils and therefore the associated benefits. FIGS. 6A-8B illustrate variations of the canted coil spring shown in FIGS. 5A-5B, as further discussed below.

The embodiment illustrated in FIGS. 5A-5B allows for the same ring inner perimeter as the spring ring of FIG. 4B but whereby the spacing at the inner perimeter is improved in that there are fewer coils aligned along the inner perimeter and less lower likelihood to butt. The spring ring of FIG. 5B may also be used to provide an improved electromagnetic interference shielding capacity.

An aspect of the present disclosure is understood to include a spring length having two ends and a plurality of coils of a first coil height and width and a plurality of coils having a second coil height and width, which are smaller than the first coil height and width, and wherein the spring length defines a spring ring having an inner perimeter when the two ends are joined and wherein the inner perimeter is defined by the plurality of coils of the first coil height and coil width only. In a particular example, the plurality of coils of the second coil height and coil width are recessed from the inner perimeter by a gap. In still yet another example, the plurality of coils of the second coil height and coil width are recessed from the plurality of coils of the first coil height and coil width along an outer perimeter 114 by a gap. The present spring ring is also understood to include a plurality of coils of the second coil height and coil width that are recessed along the inner perimeter by a gap and recessed from the outer perimeter 114 by a gap.

FIG. 6A illustrates a side view 120 and an isometric view 120' of a canted coil spring length having alternating smaller coils 122 and larger coils 124 being concentric to each other when viewed in the direction of the spring centerline E. The wire and coil dimensions of the present spring length 120, 120' equal to those of the canted coil spring length shown in FIG. 5A. However, instead of there being a larger coil 124 located between to smaller coils and vice-versa, the larger coils 124 are disposed at every two or more smaller coils 122. In the present embodiment, the larger coils are disposed at every six smaller coils 122. Such a particular coil distribution results in a canted coil spring ring with a total of four larger coils 124 only, as best seen in FIG. 6B, which shows a side view 130 and a perspective view 130' of a canted coil spring ring made from such a canted coil spring length. The spring ring 130 has a ring inner perimeter of 0.025 in. In the present embodiment, the ring inner perimeter 112 and outer perimeter 114 are also the same as those of the canted coil spring ring 110, 110' shown in FIG. 4B, although the present spring ring 130 has inner and outer perimeters defined by just a few larger coils 124. Therefore, FIGS. 6A-6B show that alternating smaller coils 122 and larger coils 124 may be used to accommodate virtually any coil distribution and yet maintain the canted configuration of the coils.

Therefore the embodiment illustrated in FIGS. 6A-6B allows for the same ring inner perimeter as the spring ring of FIG. 4B but whereby the spacing at the inner perimeter is improved in that there are fewer coils aligned along the inner perimeter. As shown, only four larger coils 124 are aligned to define the inner perimeter 112. The spring ring of FIG. 6B may also be used to provide an improved electromagnetic interference shielding capacity.

As described, an aspect of the present disclosure is understood to include a spring length having two ends and a plurality of coils of a first coil height and width and a plurality of coils having a second coil height and width, which are smaller than the first coil height and width, and wherein the spring length defines a spring ring having an inner perimeter when the two ends are joined and wherein the inner perimeter is defined by the plurality of coils of the first coil height and coil width only. In a particular example, the plurality of coils of the second coil height and coil width are recessed from the inner perimeter by a gap 132. In still yet another example, the plurality of coils of the second coil height and coil width are recessed from the plurality of coils of the first coil height and coil width along an outer perimeter 114 by a gap 132. The present spring ring is also understood to include a plurality of coils of the second coil height and coil width that are recessed along the inner perimeter by a gap and recessed from the outer perimeter 114 by a gap. In a specific example, for each plurality of coils of the first coil height and coil width, there are three or more coils of the second coil height and coil width.

Figure 7A:
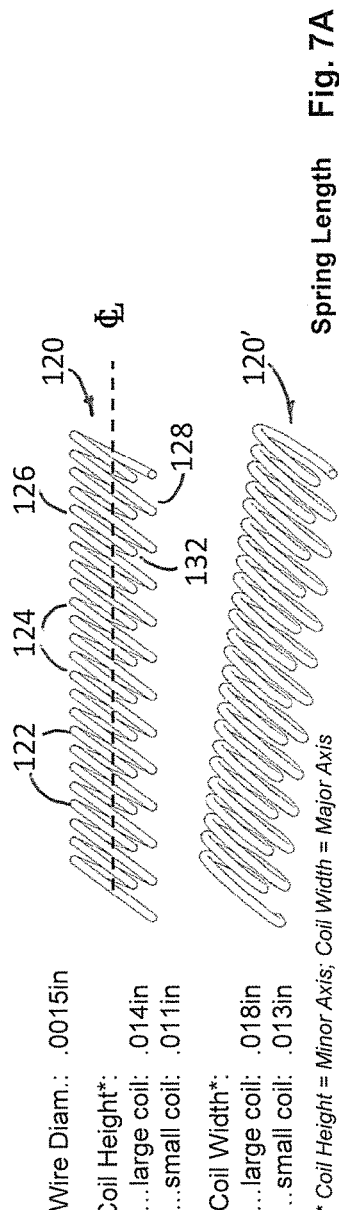
FIG. 7A shows a side view and an isometric view of a canted coil spring length in accordance with another alternative embodiment.

FIG. 7A illustrates a side view 120 and an isometric view 120' of a canted coil spring length having alternating smaller coils 122 and larger coils 124 that are eccentric or displaced relative to one another when viewed in the direction of the spring centerline E. Said differently, the smaller coils 122 are aligned with the first edge 126 and recessed from the second edge 128 by a gap 132. The dimensions of the present spring length include a wire diameter of 0.0015 in, coil heights of 0.011 in and 0.014 in for smaller coils 122 and larger coils 124, respectively, and coil widths of 0.013 in and 0.018 in for smaller coils 122 and larger coils 124, respectively. As shown, the dimensions of the larger coils 124 are the same as the dimensions of the coils 102 of the canted coil spring length shown in FIG. 4A and the spacing between the smaller coils 122 and larger coils 124 of the present embodiment is the same as the spacing between coils of the canted coil spring length shown in FIG. 4A.

Figure 7B:
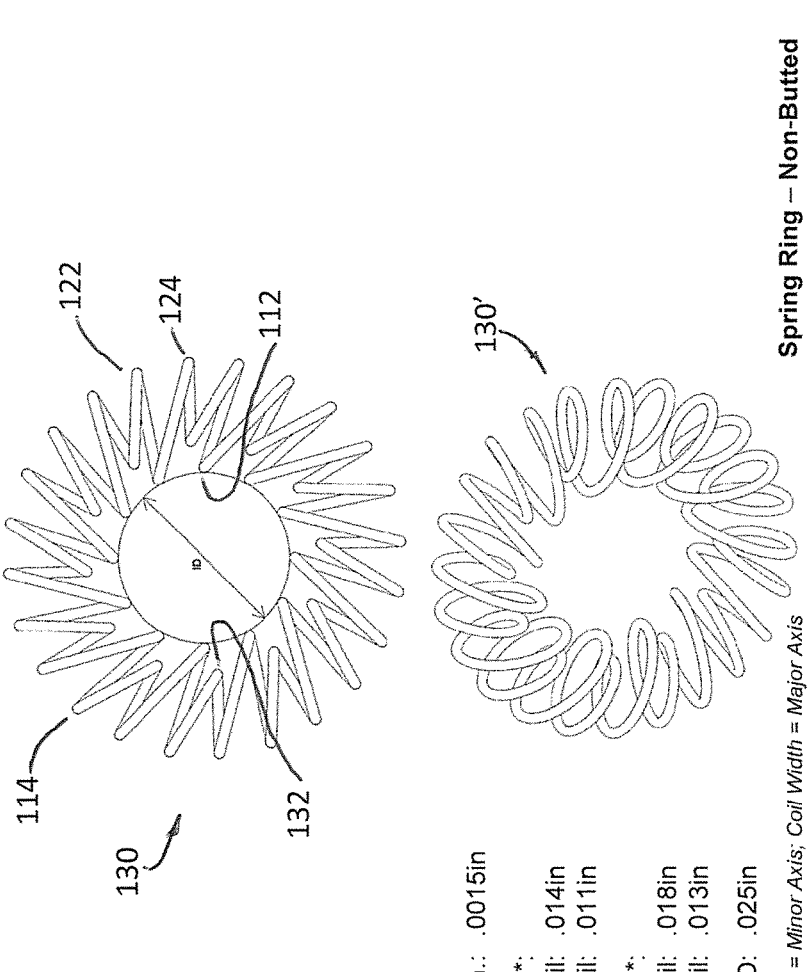
FIG. 7B shows a canted coil spring ring in side view and isometric view with alternating smaller and larger coils that can be formed from the canted coil spring length of FIG. 7A. A butted configuration of the same canted coil spring ring may also be employed (not shown).

FIG. 7B shows a side view 130 and an isometric view 130' of a canted coil spring ring generated from the canted coil spring length 120, 120' illustrated in FIG. 7A, such as by joining the spring length's two free ends. As shown, the spring ring 130, 130' has a ring inner perimeter 112 of 0.025 in. The ring inner perimeter 112 and the ring outer perimeter 114 are the same as those of the canted coil spring ring shown in FIG. 4B. However, the effective spacing between coils, which is the same as that of the canted coil spring ring shown in FIG. 5B, doubles the effective spacing between coils of such canted coil spring length shown in FIG. 4A. Said differently, the spacing for the coils 124 that align along the inner perimeter 112 of the present spring ring 130 is twice the spacing of the coils 102 that align along the inner perimeter 112 of the spring ring 110 of FIG. 4B. However, the spacing for the coils 122, 124 that align along the outer perimeter 114 of the present spring ring 130 is the same as for the coils 102 that align along the outer perimeter 114 of the spring ring 110 of FIG. 4B.

Therefore the embodiment illustrated in FIGS. 7A-7B allows for the same ring inner perimeter 112 as the spring ring of FIG. 4B but whereby the spacing at the inner perimeter 112 is improved in that there are fewer coils aligned along the inner perimeter. As shown, the spacing of the coils 124 that align along the inner perimeter is twice that of the coils 102 of FIG. 4B and wherein the coil density, such as number of total coils for a given length, is the same for both spring lengths. The spring ring 130, 130' of FIG. 7B may also be used to provide an improved electromagnetic interference shielding capacity.

As described, an aspect of the present disclosure is understood to include a spring length having two ends, which includes a first end and a second end, and a plurality of coils of a first coil height and width and a plurality of coils having a second coil height and width, which are smaller than the first coil height and width, and wherein the spring length defines a spring ring having an inner perimeter when the two ends are joined and wherein the inner perimeter is defined by the plurality of coils of the first coil height and coil width only. In a particular example, the plurality of coils of the second coil height and coil width are recessed from the inner perimeter by a gap 132. In still yet another example, the plurality of coils of the second coil height and coil width are aligned with the plurality of coils of the first coil height and coil width along an outer perimeter 114. The present spring ring is also understood to include a plurality of coils of the second coil height and coil width that are recessed along the inner perimeter by a gap and aligned with the outer perimeter 114.

FIG. 8A illustrates a side view 120 and an isometric view 120' of a canted coil spring length having alternating smaller coils 122 and larger coils 124 that are eccentric or displaced relative to one another when viewed in the direction of the spring centerline Ł. Said differently, the smaller coils 122 are aligned with the first edge 126 and recessed from the second edge 128 by a gap 132. For the present spring length 120, 120' of FIG. 8A, the wire and coil dimensions are equal to those of the canted coil spring length shown in FIG. 7A. However, instead of there being a larger coil 124 located between every other smaller coil 122, the larger coils 124 are disposed at every two or more smaller coils 122, which in the present embodiment is every six smaller coils 122. The present configuration results in a canted coil spring ring with a total of four larger coils 124 only, as seen in FIG. 7B, which shows a side view 130 and an isometric view 130' of a canted coil spring ring generated from the canted coil spring length 120, 120' of FIG. 7A. The spring ring 130, 130' has a ring inner perimeter 112 of 0.025 in. As shown, the ring inner perimeter 112 and the outer perimeter 114 are also the same as those of the canted coil spring ring shown in FIG. 4B, although in this case the inner perimeter being defined by just a few larger coils 124.

Therefore, canted coil spring ring designs of those illustrated in FIGS. 5B to 8B or similar spring rings allow for improved effective spacing between coils of a canted coil spring ring at least along the inner perimeter 112 over comparable spring rings with similar number of total coils without losing the canted configuration of the coils, such as employing fewer coils, smaller coil dimensions, different wire diameter, etc. The spring rings of the present device, system, and method may be used to adjust the force and/or conductive properties, such as electrical or thermal, of a canted coil spring ring and yet conform to possibly inflexible space constraints.

FIGS. 3A-B, 7A-B and 8A-B described herein illustrate different canted coil springs with alternating smaller coils 122 and larger coils 124 not being concentric to each other but displaced relative to one another when viewed in the direction of the spring centerline Ł. Regarding the spring ring embodiments illustrated in FIGS. 3B, 7B and 8B, the outer perimeter defined by the smaller coils, such as the outer projections of the outer edges of the smaller coils only, coincides with the outer perimeter 114 of the canted coil spring ring. Such spring ring configuration: (1) allows for the ring inner perimeter 112 to be reduced without having to increase the spring ring outer perimeter 114, which may be of interest when the purpose is to help with miniaturization of components; and (2) maintains the contact surface area at the ring outer perimeter 114, which may be of interest in conductive applications, such as for electrical or thermal, in which the spring ring is located between a conductive housing having a bore and a conductive pin, also sometimes referred to as a shaft or rod.

Figure 9:
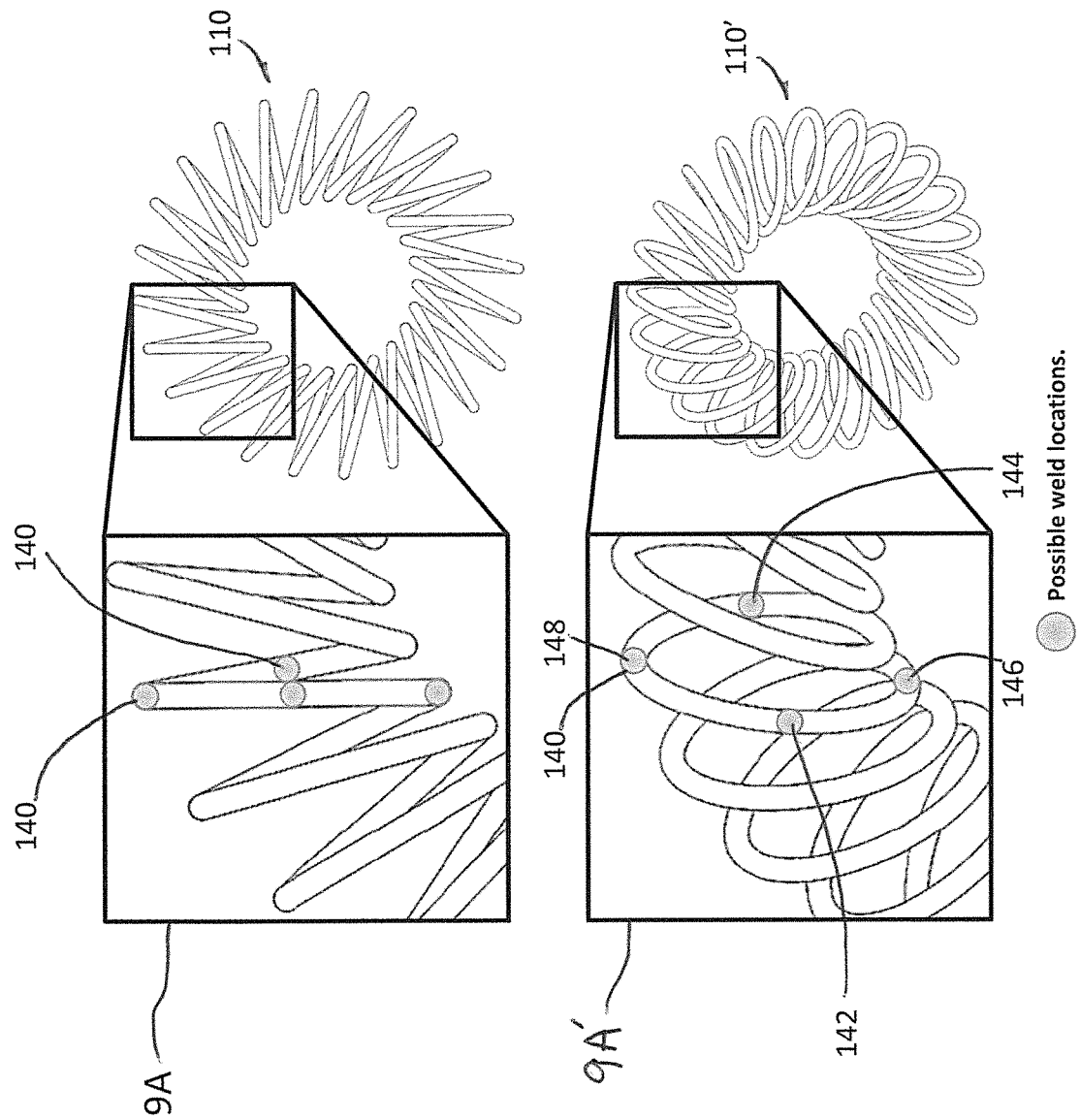
FIG. 9 illustrates a side view and an isometric view of a canted coil spring ring with possible different weld locations, shown as dotted circles, to join two ends of a spring length together. Other methods of joining two ends of a canted coil spring length to form a spring ring, such as by threaded, snap-in joint, and engagement by interference of several coils near the coil ends, are contemplated.

With reference now to FIG. 9, a side view 110 and a perspective view 110' of a spring ring are shown. The enlarged sections 9A, 9A' of FIG. 9 show possible weld locations 140 for joining two ends of a spring length to form the spring ring for a constant coil cross section canted coil spring ring. As shown, the possible weld locations are: the center portion 142 of the side coil, the center portion 144 of the back coil, the portion 146 of a coil located at the ring inner perimeter 112, and the portion 148 of a coil located at the ring outer perimeter 114.

Figure 10:
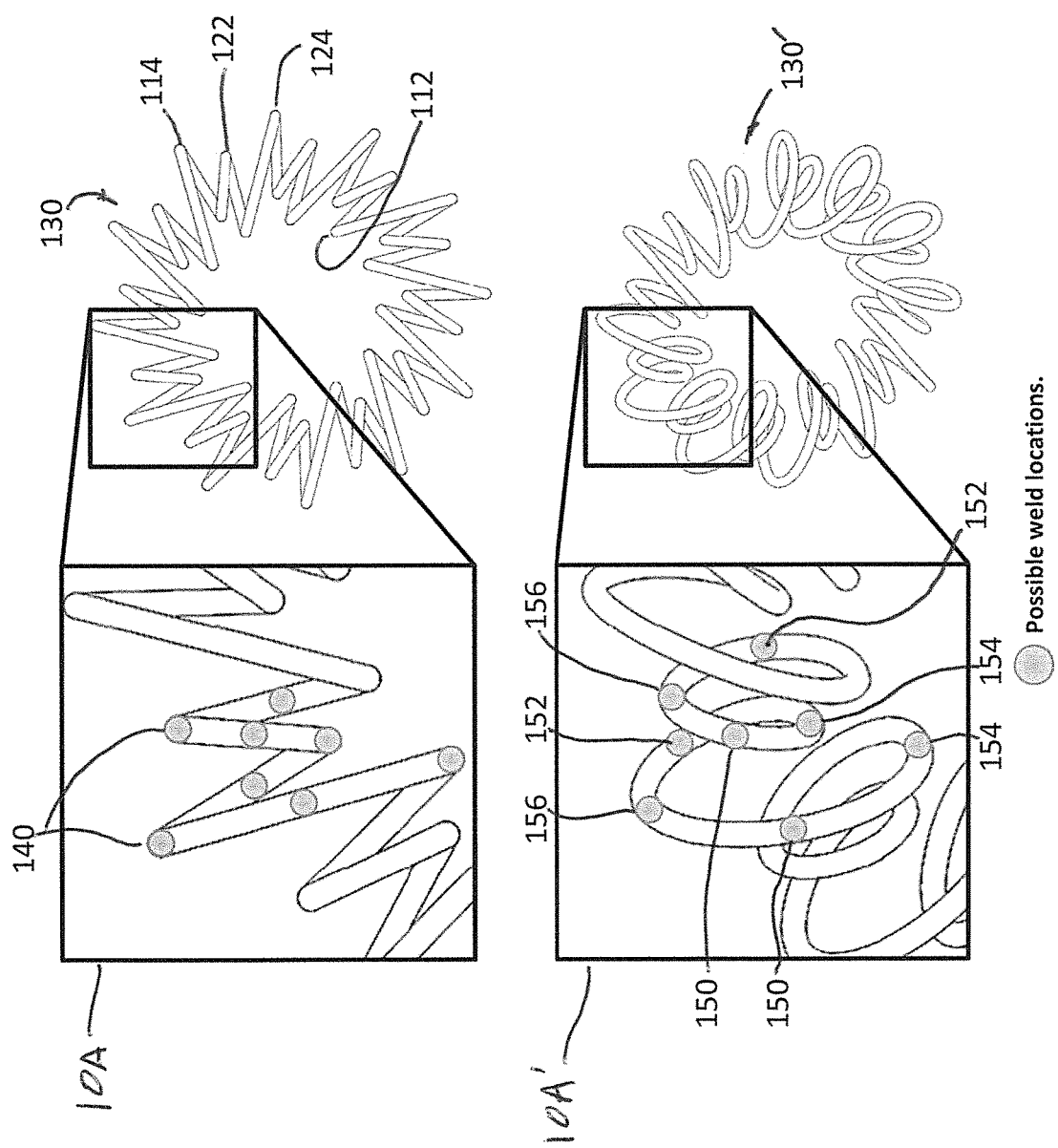
FIG. 10 illustrates a side view and an isometric view of an alternative canted coil spring ring with alternating smaller and larger coils with possible different weld locations, shown as dotted circles, to join two ends of a spring length together.

With reference now to FIG. 10, a side view 130 and a perspective view 130' of a spring ring are shown. The enlarged sections 10A, 10A' of FIG. 10 show possible weld locations 140 for joining two ends, for example forming a weld 140 to form the spring ring having coils that alternate between larger coils 124 and smaller coils 122. As shown, the possible weld locations are: the center portion 150 of any side coil, the center portion 152 of any back coil, the portion 154 of any coil located nearest to or at the ring inner perimeter 112, and the portion 156 of any coil located nearest to or at the ring outer perimeter 114. As shown, the smaller coils 122 are recessed at both the inner and outer perimeters of the spring ring.

Other methods of joining two ends of a canted coil spring length to form a spring ring are contemplated, such as by threading, snap-in joint, and engagement by interference of several coils near the coil ends.

Figure 11:
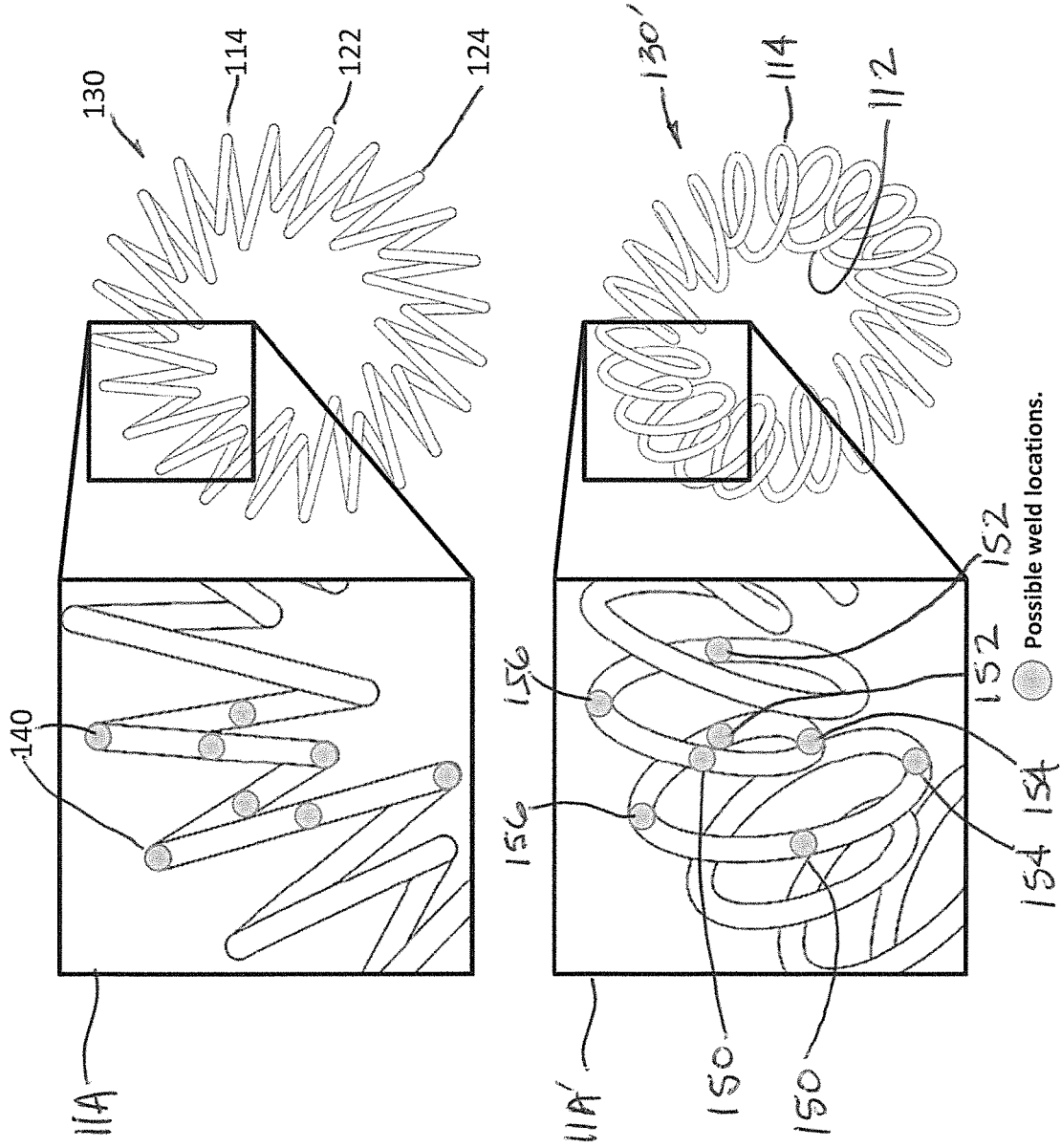
FIG. 11 illustrates a side view and an isometric view of an alternative canted coil spring ring with alternating smaller and larger coils with possible different weld locations, shown as dotted circles, to join two ends of a spring length together.

With reference now to FIG. 11, a side view 130 and a perspective view 130' of a spring ring are shown. The enlarged sections 11A, 11A' of FIG. 11 show possible weld locations 140 for joining two ends, for example forming a weld 140 to form the spring ring having coils that alternate between larger coils 124 and smaller coils 122. As shown, the possible weld locations are: the center portion 150 of any side coil, the center portion 152 of any back coil, the portion 154 of any coil located nearest to or at the ring inner perimeter 112, and the portion 156 of any coil located nearest to or at the ring outer perimeter 114. As shown, the smaller coils 122 are recessed at the inner perimeter 112 but are aligned with the larger coils 124 along the outer perimeter 114 of the spring ring 130, 130'.

FIG. 12A illustrates a side view 120 and an isometric view 120' of the canted coil spring length shown in FIG. 5A while FIG. 12B shows a helical spring length in side view 160 and perspective view 160', having alternating smaller coils 122 and larger coils 124 being concentric to each other when viewed in the direction of the spring centerline Ł, i.e., the smaller coils 122 are recessed from the first side edge 126 by a gap 132 and recessed from the second side edge 128 by a gap 132. In one example, the gaps at the first side edge 126 and the second side edge 128 are generally the same. In another example, the gaps at the first side edge 126 and the second side edge 128 are different. As shown, the spring length 160, 160' of FIG. 12B has the same wire diameter and similar coil dimensions as the spring length 120, 120' of FIG. 12A. The spring length 160, 160' of FIG. 12B may be joined at its two ends to form a spring ring for mounting onto a pin, shaft, or rod.

FIG. 13A shows a side view 120 and an isometric view 120' of the canted coil spring length shown in FIG. 7A, while FIG. 13B shows a helical spring length in side view 160 and perspective view 160' having alternating smaller coils 122 and larger coils 124 not being concentric to each other but displaced relative to one another when viewed in the direction of the spring centerline Ł, i.e., the smaller coils 122 are aligned at the first side edge 126 but are recessed from the second side edge 128 by a gap 132. As shown, the spring length 160, 160' of FIG. 13B has the same wire diameter and similar coil dimensions as the spring length 120, 120' of FIG. 13A. The spring length 160, 160' of FIG. 13B may be joined at its two ends to form a spring ring for mounting onto a pin, shaft, or rod.

FIG. 14A shows a side view 120 and an isometric view 120' of an alternative canted coil spring length design comprising a canted coil spring length having alternating smaller coils 122, medium coils 166, and larger coils 124. The smaller coils 122 and larger coils 124 being concentric to each other when viewed in the direction of the spring centerline Ł and the medium coils 166 and the larger coils 124 being displaced relative to one another when viewed in the same direction of the centerline Ł. In other words, the smaller coils 122 are recessed from the first side edge 126 by a gap 132 and recessed from the second side edge 128 by a gap 132. The medium coils 166 are aligned with the first side edge 126 but are recessed from the second side edge 128 by a gap 132. FIG. 14B shows a helical spring length in side view 160 and perspective view 160' having smaller coils 122, medium coils 166, and larger coils 124. The smaller coils 122 and the larger coils 124 are concentric to each other when viewed in the direction of the spring centerline, i.e., the smaller coils 122 are recessed from the first side edge 126 by a gap 132 and recessed from the second side edge 128 by a gap 132. In one example, the gaps at the first side edge 126 and the second side edge 128 are generally the same. The medium coils 166 and the larger coils 124 are displaced relative to one another when viewed in the same direction of the Ł, the medium coils 166 are aligned at the first side edge 126 but are recessed from the second side edge 128 by a gap 132. As shown, the spring length 160, 160' of FIG. 14B has the same wire diameter and similar coil dimensions as the spring length 120, 120' of FIG. 14A. The spring length 160, 160' of FIG. 13B may be joined at its two ends to form a spring ring for mounting onto a pin, shaft, or rod.

All canted coil springs shown and described herein have elliptical coil cross sections. In other words, when viewing the coils down the spring centerline Ł, the coils have an elliptical shape in which the col height is smaller than the coil width. However, not only do elliptical coils but also non-elliptical coils may be considered and practiced in accordance with aspects of the present disclosure. FIGS. 15A and 15B show canted coil spring rings 130 having alternating smaller elliptical coils 122 and larger elliptical coils 124. Spring sections 172 and 174 of FIG. 15A show the relative positions of the coils 122, 124 when viewed along the mid-line 170 of the spring ring 130 of FIG. 15A. Spring sections 172 and 174 of FIG. 15B show the relative positions of the coils 122, 124 when viewed along the mid-line 170 of the spring ring 130 of FIG. 15B.

FIG. 15C shows a canted coil spring ring 130 having alternating smaller elliptical coils 122 and larger square coils 190. Spring sections 172 and 174 of FIG. 15C show the relative positions of the coils 122, 190 when viewed along the mid-line 170 of the spring ring 130 of FIG. 15C. FIG. 15D shows a canted coil spring ring 130 having alternating smaller square coils 192 and larger square coils 190. Spring sections 172 and 174 of FIG. 15D show the relative positions of the coils 190, 192 when viewed along the mid-line 170 of the spring ring 130 of FIG. 15D.

FIG. 15E shows a canted coil spring ring 130 having alternating smaller elliptical coils 122 and larger D shaped coils 196. Spring sections 172 and 174 of FIG. 15E show the relative positions of the coils 122, 196 when viewed along the mid-line 170 of the spring ring 130 of FIG. 15E. As shown, the smaller coils 122 are recessed from the inner and outer perimeters defined by the larger D shaped coils 196. The gaps 132 at the inner and outer perimeters 112, 114 are approximately the same but in other embodiments they can differ. FIG. 15G show a canted coil spring ring 130 having alternating smaller elliptical coils 122 and larger D shaped coils 196. Spring sections 172 and 174 of FIG. 15G show the relative positions of the coils 122, 196 when viewed along the mid-line 170 of the spring ring 130 of FIG. 15G. As shown, the smaller coils 122 are recessed from the inner and outer perimeters defined by the larger D shaped coils 196. The gap 132 or amount of recess at the outer perimeter 114 differs from the gap 132 at the inner perimeter 112.

FIG. 15F shows a canted coil spring ring 130 having alternating smaller D shaped coils 198 and larger D shaped coils 196. Spring sections 172 and 174 of FIG. 15F show the relative positions of the coils 196, 198 when viewed along the mid-line 170 of the spring ring 130 of FIG. 15F. As shown, the smaller D shaped coils 198 are recessed from the inner perimeter 112 defined by the larger D shaped coils 196 but are generally aligned with the outer perimeter 114. FIG. 15H shows a canted coil spring ring 130 having alternating smaller D shaped coils 198 and larger D shaped coils 196. Spring sections 172 and 174 of FIG. 15H show the relative positions of the coils 196, 198 when viewed along the mid-line 170 of the spring ring 130 of FIG. 15F. As shown, the smaller D shaped coils 198 are recessed from the inner perimeter 112 defined by the larger D shaped coils 196 but are generally aligned with the outer perimeter 114. The smaller D shaped coils 196 in the embodiment of FIG. 15F face, i.e., having curved sections and straighter sections, in the opposite direction compared to the smaller D shaped coils 196 in the embodiment of FIG. 15H.

FIG. 15I shows a canted coil spring ring 130 having alternating smaller elliptical coils 122 and larger coils 200 having a depressed outer portion 202 depressed toward the exterior of the spring ring. Spring sections 172 and 174 of FIG. 15I show the relative positions of the coils 122, 200 when viewed along the mid-line 170 of the spring ring 130 of FIG. 15I. FIG. 15J shows a canted coil spring ring 130 having alternating smaller coils 204 and larger coils 200 with both having depressed outer portions 202 depressed toward the exterior of the spring ring. In alternative embodiments, the depressed portions 202 of FIGS. 15I and 15J may be rotated or positioned along the inner perimeter 112. The depressed portions are configured to increase the contact points or surface areas between the coils and the surface that the coils come in contact with. This in turn lowers resistance for current or electric flow through the coils.

FIG. 15K shows a canted coil spring ring 130 having alternating smaller elliptical coils 122 and larger coils 200 having depressed inner and outer portions 202. Spring sections 172 and 174 of FIG. 15K show the relative positions of the coils 122, 200 when viewed along the mid-line 170 of the spring ring 130 of FIG. 15K. FIG. 15L shows a canted coil spring ring 130 having alternating smaller coils 204 having depressed outer portions 202 along the spring ring outer perimeter 114 and larger coils 200 having depressed inner and outer portions 202 along the spring ring inner perimeter 112 and outer perimeter 114.

With reference again to FIGS. 15E to 15H, different possible ways to generate D shaped coil cross sections, i.e., D shaped coils, are shown. D shaped coils shown in FIGS. 15E and 15F are achieved by flattening the outer portion of the coils, whereas those shown in FIGS. 15G and 15H are achieved by bending the coils so that the inner portion has a first canting angle and the outer portion has a second canting angle, the first canting angle being smaller than the second canting angle.

The canted coil spring rings illustrated herein having smaller and larger coils displaced relative to one another when viewed in the direction of the spring centerline have the ring outer perimeter defined by both the smaller and the larger coils. However, a canted coil spring ring may have smaller and larger coils displaced relative to one another when viewed in the referred direction and yet have the ring outer perimeter defined by the larger coils only.

Figure 16A:
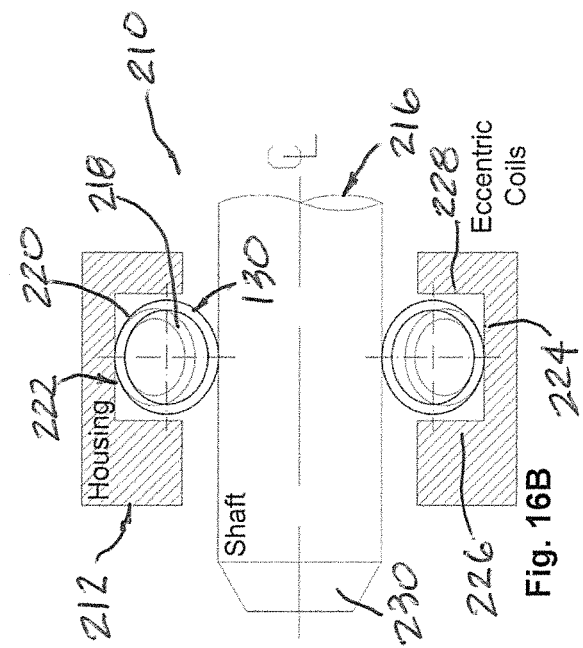

FIGS. 16A-F show different connector assemblies 210 with each comprising a housing 212 having a bore 214 receiving a shaft 216, which may also be referred to as a pin or a rod, inserted into the bore 214 with a canted coil spring ring 130 disposed in the bore and biasing against the housing 212 and the shaft 216. As shown, the spring ring 130 comprises alternating smaller coils 218 and larger coils 220 engaging the housing and the shaft. With reference specifically to FIG. 16A, the spring ring 130 shown may embody any of the spring ring discussed elsewhere herein having alternating smaller coils and relatively larger coils positioned in a housing groove 222, which has a groove bottom 224 and two sidewalls 226, 228. As shown, the groove bottom is a V-groove. In another example, the V-groove has a flat surface located between the two tapered surfaces. The groove bottom 224 may alternatively have a single slanted surface relative to the shaft centerline or a complex curve. As shown, the two sidewalls 226, 228 are generally parallel to one another. In another example, the two sidewalls are not generally parallel to one another, such as being tapered relative to the housing centerline. The shaft 216 is shown with a tapered insertion end 230 for lifting the coils 218, 220 during insertion of the shaft. The shaft 216 is shown without a shaft groove. In another example, the shaft has an external shaft groove and the connector has a pair of grooves.

In general, the present spring embodiments with unique capabilities that enable them to have smaller inner perimeters may be used with connectors that may be categorized as a holding connector, a latching connector, or a locking connector. These connectors typically include a housing and a pin and the canted coil spring is used therebetween the secure the two together. A holding connector is understood to utilize a spring force provided by the canted coil spring against a flat surface so that friction and the spring force prevent the pin and the housing from separating. A holding connector can have a single groove on the inside bore of the housing or on an exterior surface of the pin. A latching connector is understood to include a pair of grooves, one on or in the housing bore and one on an exterior surface of the pin. The spring is trapped between the pair of grooves to latch the pin to the housing. Separation is possible by moving the pin and the housing relative to one another without destroying the spring. A locking connector has a pair of grooves like a latching connector. However, due to the groove geometries for the pair of grooves in the locking connector, the pin cannot separate from the housing without destroying the spring. If separation is attempted, the spring can be plastically deformed. Thus, in accordance with this understanding, the canted coil springs having the unique inner perimeter spacing characteristics discussed herein are usable with any connector having any groove geometry for purposes of holding, latching, or locking application. Exemplary locking connectors are disclosed in U.S. Pat. Nos. 5,411,348 and 5,082,390, the contents of which are expressly incorporated herein by reference for purposes of teaching groove geometries for use with the present spring rings for locking applications. Exemplary latching and locking connectors are disclosed in U.S. Publication No. 2010-0090379A1, U.S. patent application Ser. No. 12/614,769, the contents of which are expressly incorporated herein by reference for purposes of teaching groove geometries for use with the present spring rings for locking and latching applications.

Figure 16B:
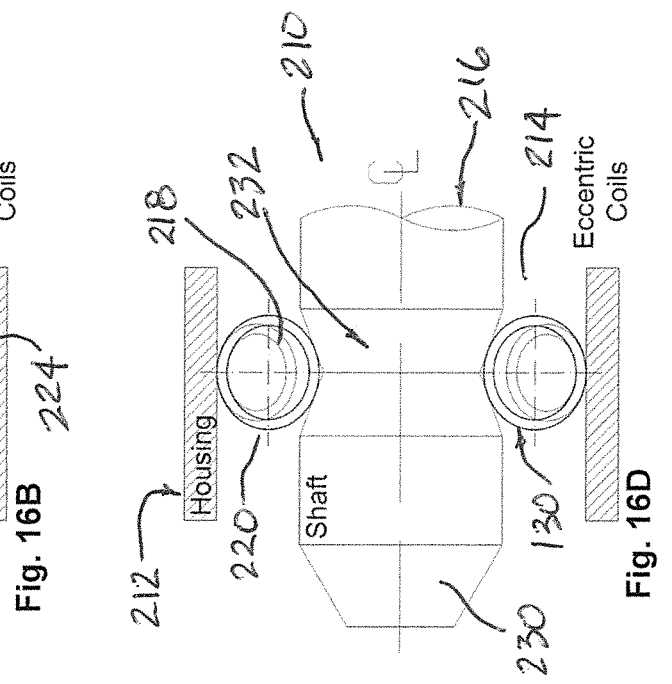

FIG. 16B shows a connector 210 that is similar to the connector of FIG. 16A but wherein the housing groove has a groove bottom 224 that is generally flat, i.e., generally parallel, relative to the centerline of the shaft 216. In another example, the groove bottom 224 tapers relative to the shaft centerline. As shown, the two sidewalls 226, 228 are generally parallel to one another. In another example, the two sidewalls are not generally parallel to one another. The shaft 216 is shown with a tapered insertion end 230 for lifting the coils 218, 220 during insertion of the shaft. The shaft 216 is shown without a shaft groove. In another example, the shaft has an external shaft groove.

Figure 16C:
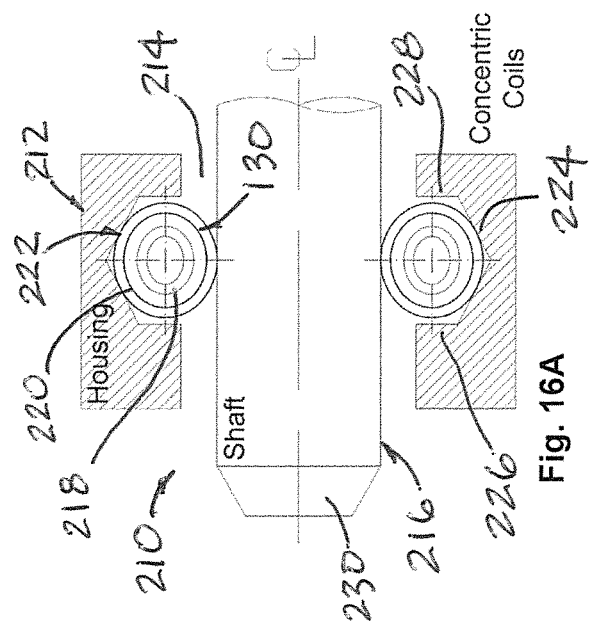
Figure 16D:
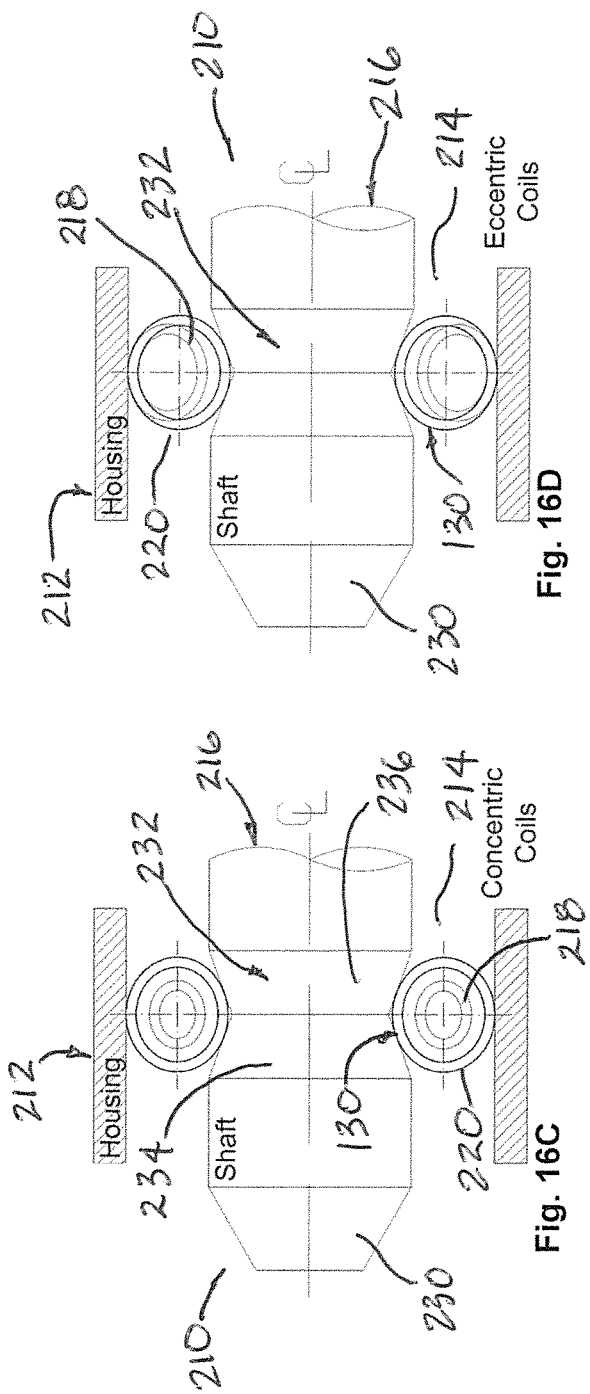

FIGS. 16C and 16D show two connector assemblies 210 each with a housing 212 having a bore 214 having a shaft or pin 216 disposed therein and a canted coil spring ring 130 positioned therebetween and biasing against both the housing 212 and the pin 216. In the two embodiments, the spring 130 is located in a pin groove 232, which comprises two groove surfaces 234, 236. The housings 212 of FIGS. 16C and 16D do not incorporate a housing groove. As shown, the pin groove 232 is a V-groove. In another example, a generally flat bottom surface is located between the two groove surfaces 234, 236. The spring 130 shown in FIG. 16C has smaller coils 218 and relatively larger coils 220 that are concentric to each other when viewed in the direction of the spring centerline E, i.e., wherein the smaller coils 218 are recessed from the inner perimeter 112 of the spring ring 130 by a gap and the outer perimeter 114 by a gap. The spring 130 shown in FIG. 16D has smaller coils 218 and relatively larger coils 220 that are eccentric to each other when viewed in the direction of the spring centerline E, i.e., wherein the smaller coils 218 are recessed from the inner perimeter 112 of the spring ring 130 by a gap but are aligned with the larger coils 220 along the outer perimeter 114 by a gap. However, any of the spring rings discussed elsewhere herein may be used for the spring ring 130 of FIGS. 16C and 16D.

FIG. 16E shows a connector 210 where both the housing 212 and the pin 216 are grooved for retaining the spring ring 130. As shown, the housing 212 resembles that of FIG. 16A and has a groove 222 that can embody any of the groove geometries described and incorporated herein by reference. The pin groove 232 shown in FIG. 16E has a bottom surface 240 located between two sidewalls 242, 244. In one example, the bottom surface 240 is generally parallel to the pin centerline with other configurations contemplated. The first sidewall 242 is shown with a taper while the second sidewall 244 is shown generally orthogonal to the shaft centerline. In other examples, the sidewalls 242, 244 have different configurations, such as being reversed, both are generally orthogonal to the shaft centerline, both are tapered, etc. The pin groove 232 may also be sized and shaped so that the pin groove contacts the spring coils at multiple surfaces when latched. For example, the pin groove 232 of FIG. 16E may be a V-groove and both slanted surfaces of the V-groove contact the spring ring when latched.

FIG. 16F shows a connector assembly 210 that is similar to that of FIG. 16E but where the housing groove 222 is similar to that of FIG. 16B. For both connectors 210, the spring ring 130 may be any of the spring rings discussed elsewhere herein and the housing groove 222 and pin groove 232 may embody any of the groove geometries described or incorporated herein by reference.

Although spring rings, i.e., garter-shaped springs or circular shaped springs, are discussed extensively herein, the present device, system, and method include non-circular coil spring rings. With reference to the connector 210 of FIG. 17A, a housing 212 is shown with a bore 214 having a pin 216 disposed therein and a spring ring 130 biased against the housing and the pin. The connector 210, including the spring 130, may embody one of the connectors discussed elsewhere herein. In the present embodiment, the cross-sectional shape of the shaft 216 may be circular or non-circular.

With reference to FIG. 17B(1), a cross-sectional end view of the shaft 216 of FIG. 17A is shown taken along line A-A. As shown, the shaft has a circular shaft cross section. However, FIG. 17B(2) show the same shaft 216 can have a non-circular cross-section, such as having an elliptical shaft cross section taken along the same view. FIGS. 17B(3) to 17B(6) show additional alternative shaft cross-sections, including a quadrangular shape 254, a rectangular shape 256, a triangular shape 258, and a hexagonal shape 260. However, any other ring shape shaft cross-section is contemplated and understood to fall within the scope of the present application. The multi-sided shafts of FIGS. 17B(3) to 17B(6) may generically be referred to as a shaft with a polygonal shape cross-section.

FIGS. 18A-18D show various gasket assemblies 270 each comprising a groove 272 receiving a canted coil spring ring 130 having alternating smaller coils 218 and larger coils 220. The groove 272 is sized and shaped to position the spring ring 130, such as to hold the spring in the groove in a certain orientation, so that the spring can be loaded in a selected direction, referred to as a loading direction. The loading direction in the gasket assemblies 270 of FIGS. 18A to 18D is parallel to the sidewalls 274, 276 of the groove 272 and to the minor axis or coil height of the coils. The spring rings 130 of the various gasket assemblies may embody any of the spring ring discussed elsewhere herein.

Figure 18A:
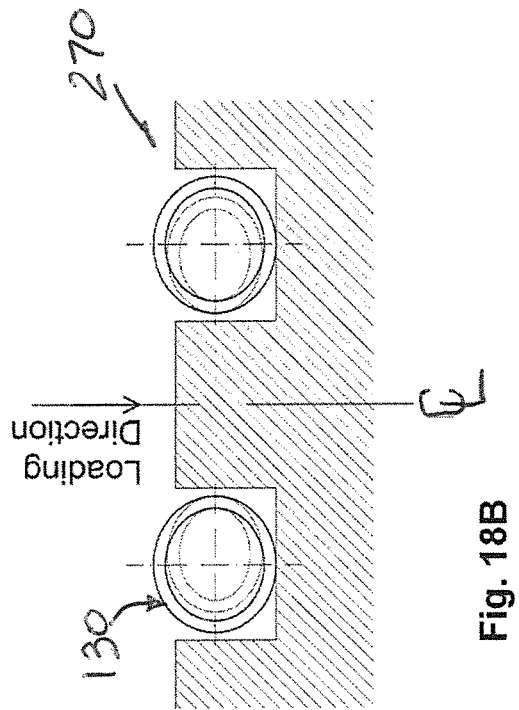
FIGS. 18A-18G show various gasket assemblies.
Figure 18B:
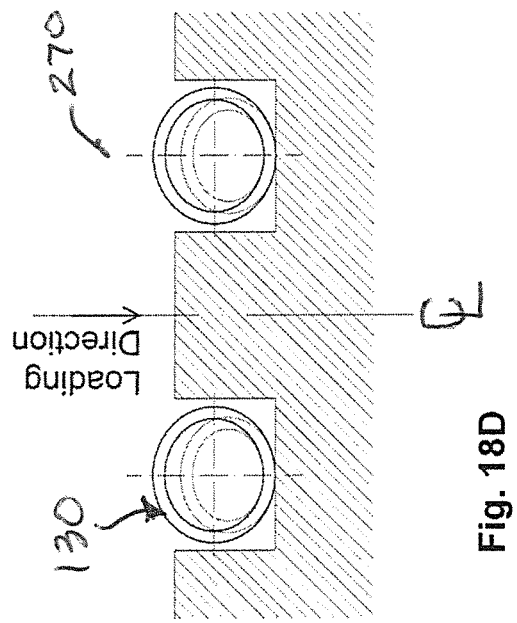
Figure 18C:
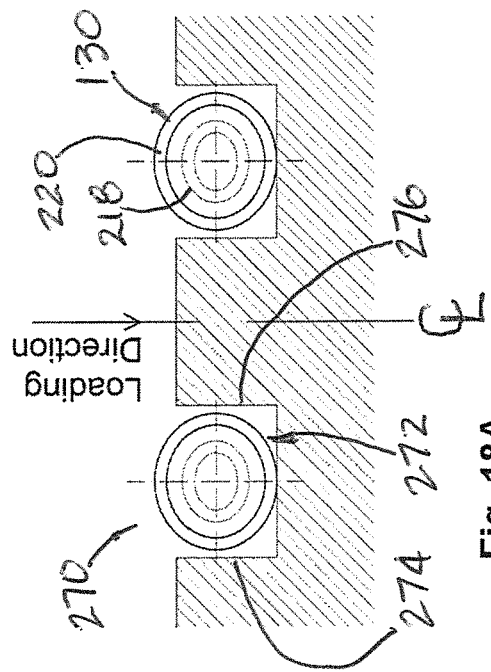
Figure 18D:
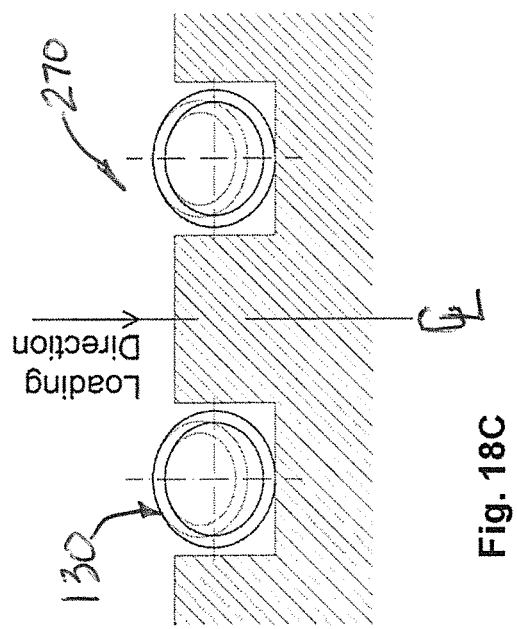
Figure 18E:
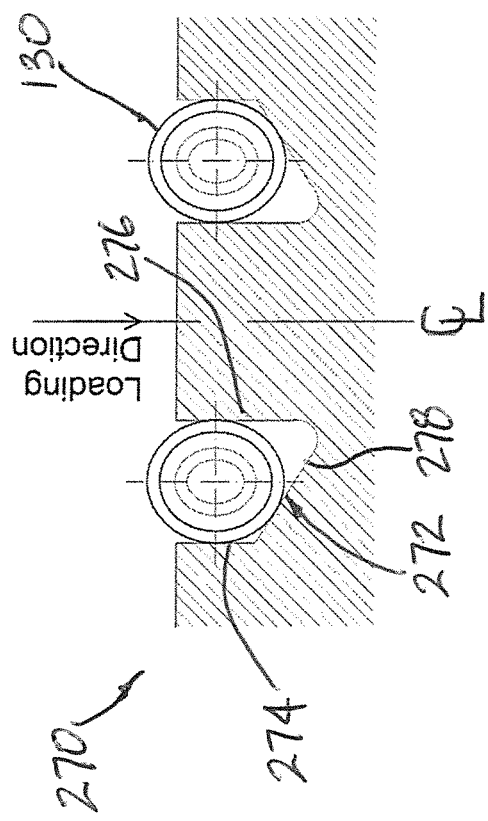
Figure 18G:
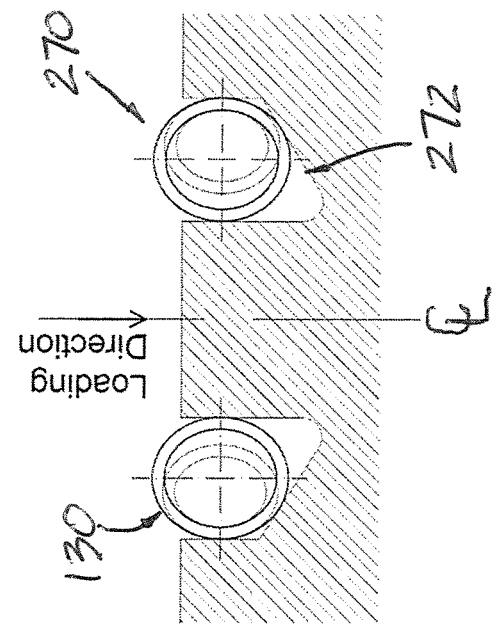
Figure 18F:
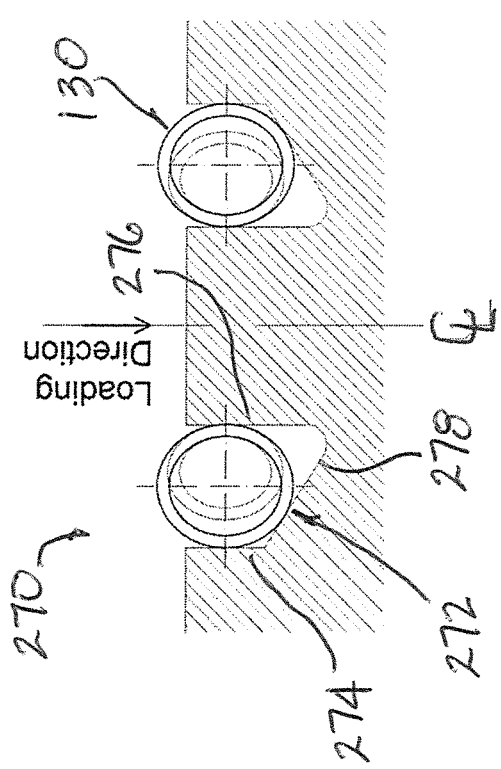

With reference now to the gasket assemblies 270 of FIGS. 18E-18G, the loading direction of the gasket assemblies is parallel to the side walls 274, 276 of the groove 272 and the major axis or coil width of the coils. However, none of these parallelisms is required. FIGS. 18E to 18G each shows a groove 272 having a convex bottom surface 278 disposed aslant to the sidewalls 274, 276. Such bottom surface 278 may be concave instead and it may form a right angle with the sidewalls 274-276. The spring rings 130 of the various gasket assemblies may embody any of the spring ring discussed elsewhere herein.

FIGS. 19 to 22 show canted coil springs having more than two plurality of coils alternating with each other according to an alternating pattern. For example, these canted coil springs have a first through Nth plurality of coils having Nth different coil sizes, i.e., Nth different coil widths and coils heights, where "N" represents a whole integer.

With reference now to FIG. 19, a side view of an alternative spring length 120 is shown, which comprises a plurality of coils with alternating coil sizes. As shown, the spring length 120 comprises three larger coils 124 each having a first coil height and coil width (called a first set of coil dimensions) that are spaced from three smaller coils 122 with each having a second coil height and coil width (called a second set of coil dimensions), which are smaller than the first set of coil dimensions. A plurality of intermediate coils 290 having coil widths and coil heights of values between the first and the second set of coil dimensions are located between the larger coils 124 and the smaller coils 122. In the present embodiment, three intermediate coils 292, 294, 296 having three different intermediate coil dimensions are incorporated. Each intermediate coil has a coil width and a coil height which differ from the adjacent intermediate coil width and coil height. As shown, the intermediate coil 292 is larger than the intermediate coil 294 and which is larger than the intermediate coil 296. The largest intermediate coil 292 is located closest to the larger coils 124 whereas the smaller intermediate coil 296 is located closest to the smaller coils 122. Thus, the spring length 120 of FIG. 19 has the following coil alternating pattern: large coils 124, intermediate coils 290, small coils 122, intermediate coils 290, and then repeat. In an example, there are three large coils 124, three intermediate coils 290, and three small coils 122. In a specific example, the three large coils have the same coil dimensions, the three small coils have the same coil dimensions, and the three intermediate coils have different dimensions that very between the large and the small coil dimensions.

The spring length 120 of FIG. 19 is connectable at its two ends to form a spring ring comprising an inner perimeter and an outer perimeter. In the present embodiment, the spring ring formed from said spring length 120 of FIG. 19 will have had inner and outer perimeters defined by the three consecutively positioned larger coils 124. The intermediate coils 290 and the smaller coils 122 would be located between adjacent sets of larger coils 124. The effective spacing between coils of the canted coil spring ring formed from the spring length 120 of FIG. 19 will have improved coil spacing along the inner perimeter and therefore less likely to be butted along the inner perimeter compared to a similar canted coil spring made entirely from the same larger coils 124.

The spring length 120 of FIG. 20 shows yet another alternative spring length 120 provided in accordance with aspects of the present device, system, and method. As shown, the spring length 120 comprises a plurality of coils with the following coil alternating pattern: a single large coil 124, a single first intermediate coil 292, a single second intermediate coil 294, a small coil 122, and then repeat. The spring length 120 of FIG. 20 is connectable at its two ends to form a spring ring comprising an inner perimeter and an outer perimeter. In the present embodiment, the spring ring formed from said spring length 120 of FIG. 20 will have had inner and outer perimeters defined by the larger coils 124. The intermediate coils 292, 294 and the smaller coils 122 would be located between adjacent larger coils 124.

The spring length 120 of FIG. 21 shows yet another alternative spring length 120 provided in accordance with aspects of the present device, system, and method. As shown, the spring length 120 comprises a plurality of coils with the following coil alternating pattern: a single large coil 124, a single first intermediate coil 292, a single second intermediate coil 294, two consecutive small coils 122, a single second intermediate coil 294, a single first intermediate coil 292, and then repeat. The spring length 120 of FIG. 21 is connectable at its two ends to form a spring ring comprising an inner perimeter and an outer perimeter. In the present embodiment, the spring ring formed from said spring length 120 of FIG. 21 will have had inner and outer perimeters defined by the larger coils 124. The intermediate coils 292, 294 and the smaller coils 122 would be located between adjacent larger coils 124.

The spring length 120 of FIG. 22 shows yet another alternative spring length 120 provided in accordance with aspects of the present device, system, and method. As shown, the spring length 120 comprises a plurality of coils with the following coil alternating pattern: a single large coil 124, a single first intermediate coil 292, a single second intermediate coil 294, a single small coil 122, a single second intermediate coil 294, a single first intermediate coil 292, and then repeat. The spring length 120 of FIG. 22 is connectable at its two ends to form a spring ring comprising an inner perimeter and an outer perimeter. In the present embodiment, the spring ring formed from said spring length 120 of FIG. 22 will have had inner and outer perimeters defined by the larger coils 124. The intermediate coils 292, 294 and the smaller coils 122 would be located between adjacent larger coils 124.

In other examples, spring lengths of different coil alternating patterns are contemplated. Also, while the spring lengths 120 of FIGS. 19-22 have coils that are concentric to each other when viewed in the direction of the spring centerline $L$, the coils can be eccentric or aligned to the first side edge 126.

Still further, when a canted coil spring ring is described having a first coil type alternating with a second coil type to form a ring with an outer perimeter and an inner perimeter defined by the first coil type only, the spring ring can include additional coil type or types. For example, the spring lengths of FIGS. 19-22 have coils that alternate between the larger coils 124 and the smaller coils 122 but wherein other coil types, such as intermediate coils 290, can also alternate between the larger coils 124 and the smaller coils. Thus, unless the context indicates otherwise, the reference to only a first coil type alternating with a second coil type does not exclude a spring length or spring ring having other coil types, which is understood to mean different coil shape and/or coil dimensions.

In another example, although less preferred, any of the foregoing spring lengths described in accordance with aspects of the present disclosure may include other coil type or types positioned along with the largest coils to define the inner perimeter. For example, with reference to FIG. 19 in which multiple coil types are shown, one or two of the intermediate coil types, such as coil 292, coil 294 or coil 296, may align along the inner perimeter, such as aligned with the second side edge 128. This will also reduce the inner perimeter dimension for that particular spring length when connecting the two free ends to from a spring ring compared to a constant coil cross section canted coil spring ring made of a similar material and having a similar total number of coils.

FIG. 23 shows various wire cross sections that may be used to form the canted coil spring lengths for forming any of the disclosed spring rings shown and described herein. The exemplary wires include the following wire cross sections, in addition to being round: an elliptical wire 300, a flat wire 302, a polygonal wire 304, a star shaped wire 306, and a U-shaped wire 308. Other shaped wires are contemplated.

Although limited embodiments of canted coil springs and connector assemblies and their components have been specifically described and illustrated herein, many modifications and variations will be apparent to those skilled in the art. For example, the various canted coil springs and connector assemblies may incorporate different metal claddings or different platings, may be used in different end applications, etc. For example, the connectors described with reference to 16A-16F may be used in any number of industries, including in aerospace, automotive, military defense, consumer electronics, oil and gas, etc. Furthermore, it is understood and contemplated that features specifically discussed for one canted coil spring and connector assembly embodiment may be adopted for inclusion with another canted coil spring and connector assembly embodiment, provided the functions are compatible. For example, while one connector is described with certain groove geometry and a certain spring ring, different groove geometries and different spring rings with different coil alternating patterns may be used that are described elsewhere herein. Accordingly, it is to be understood that the canted coil springs and connector assemblies and their components constructed according to principles of the disclosed device, system, and method may be embodied other than as specifically described herein. The disclosure is also defined in the following claims. Still furthermore, where one feature of an embodiment is shown but not expressly described but the same or similar feature is shown and described in another embodiment, the disclosed part may be understood to describe or teach the same or similar feature in the other disclosed but not expressly described embodiment. The disclosure is therefore understood to teach a person of ordinary skill in the art the disclosed embodiments without having to repeat similar components in all embodiments.

What is claimed is:

1. A canted coil spring ring comprising:
a plurality of interconnected coils having two ends that are welded together to define the spring ring; the plurality of interconnected coils comprising a first plurality of coils and a second plurality of coils;
said first plurality of coils each having a first coil major axis, a first coil minor axis and a coil center defined by the intersection of said first coil major and minor axes; a first centerline defined by the plurality of coil centers resulting from said first plurality of coils, and each coil of said first plurality of coils canted along said first centerline;

said second plurality of coils each having a second coil major axis, a second coil minor axis and a coil center defined by the intersection of said second coil major and minor axes; a second centerline defined by the plurality of coil centers resulting from said second plurality of coils, and each coil of said second plurality of coils canted along said second centerline;

wherein the coils of said first plurality of coils alternate with the coils of said second plurality of coils according to an alternating pattern;

wherein the spring ring comprises an outer perimeter and an inner perimeter, wherein said inner perimeter is defined by said first plurality of coils only and said outer perimeter is defined by said first plurality of coils only or by both of said first and second plurality of coils; and wherein said spring ring has a minimum reachable inner perimeter, which is defined as a minimum value that can be reached without the first plurality of coils having butted, that is smaller than a minimum reachable inner perimeter of a canted coil spring with a constant coil cross section having a similar total number of coils, spring length, and coil major axis and coil minor axis that are similar to those of said first plurality of coils.

2. The canted coil spring of claim 1, wherein a portion of at least one coil of said second plurality of coils is moved through at least one coil of said first plurality of coils under a state of deflection of said coil spring ring.

3. The canted coil spring of claim 1, further comprising a third plurality of coils alternate with the coils of said first and said second plurality of coils according to an alternating pattern.

4. The canted coil spring of claim 1, wherein only each of the first plurality of coils has a depressed outer portion depressed towards an interior of the first plurality of coils.

5. The canted coil spring of claim 4, wherein each of the first plurality of coils has another depressed outer portion depressed towards the interior of the first plurality of coils.

6. The canted coil spring of claim 1, further comprising a housing having a bore and wherein the canted coil spring is located inside the bore.

7. The canted coil spring of claim 6, wherein said housing comprises a housing groove and wherein the canted coil spring is located in said housing groove.

8. The canted coil spring of claim 7, further comprising a pin passing through the inner perimeter of said canted coil spring.

9. The canted coil spring of claim 8, wherein said pin has a pin groove and said canted coil spring is located in said pin groove.

10. The canted coil spring ring of claim 1, wherein the alternating pattern comprises a coil from the first plurality of coils positioned next to a coil from the second plurality of coils.

11. The canted coil spring ring of claim 1, wherein the alternating pattern comprises a coil from the first plurality of coils positioned next to two or more coils from the second plurality of coils.

12. The canted coil spring ring of claim 1, wherein the first and second plurality of coils have a coil cross-sectional shape that is circular, elliptical, polygonal, or star-shaped.

13. A method of forming a canted coil spring ring, said method comprising the steps:

forming a spring length having a plurality of coils and two ends, wherein said forming of the spring length comprises:

forming a first plurality of coils with each coil having a first coil major axis, a first coil minor axis and a coil center defined by the intersection of said first coil major and minor axes; a first centerline defined by the plurality of coil centers resulting from said first plurality of coils, and each coil of said first plurality of coils canted along said first centerline;

forming a second plurality of coils with each coil having a second coil major axis, a second coil minor axis and a coil center defined by the intersection of said second coil major and minor axes; a second centerline defined by the plurality of coil centers resulting from said second plurality of coils, and each coil of said second plurality of coils canted along said second centerline;

joining the two ends to form a spring ring; and wherein the coils of said first plurality of coils alternate with the coils of said second plurality of coils according to an alternating pattern;

wherein the spring ring comprises an outer perimeter and an inner perimeter, wherein said inner perimeter is defined by said first plurality of coils only and said outer perimeter is defined by said first plurality of coils only or by both of said first and second plurality of coils; and wherein said spring ring has a minimum reachable inner perimeter, which is defined as a minimum value that can be reached without the first plurality of coils having butted, that is smaller than a minimum reachable inner perimeter of a canted coil spring with a constant coil cross section having a similar total number of coils, spring length, and coil major axis and coil minor axis that are similar to those of said first plurality of coils.

14. The method of claim 13, further comprising causing two or more coils of said second plurality of coils to cross into and being surrounded by said first plurality of coils.

15. The method of claim 13, further comprising moving said second plurality of coils through said first plurality of coils under a state of deflection of said coil spring ring.

16. The method of claim 13, wherein the two ends of said spring length are joined by welding a center portion of a side coil, a center portion of a back coil, a portion of a coil located nearest to or at the inner perimeter, or a portion of a coil located nearest to or at the outer perimeter.

17. The method of claim 16, further comprising placing said spring ring inside a bore of a housing and inserting a pin through the inner perimeter of the spring ring.

18. The method of claim 17, wherein the housing has a housing groove, the pin has a pin groove or the housing and the pin can each have a groove.

19. The method of claim 18, wherein the housing groove has a V-groove.

20. The method of claim 13, wherein a first of the two ends is located at one of the first plurality of coils or the second plurality of coils and a second of the two ends is located at another one of the first plurality of coils or the second plurality of coils.

21. The method of claim 13, further comprising placing said spring ring inside a bore of a housing and inserting a pin through the inner perimeter of the spring ring.

22. The method of claim 21, wherein the housing has a housing groove, the pin has a pin groove or the housing and the pin can each have a groove.

23. The method of claim 13, further comprising forming the first plurality of coils from a wire cross-section having a circular shape, an elliptical shape, a flat rectangular shape, a square shape, a D-shape, a polygonal shape, a star shape, or a U-shape.

24. The method of claim 23, wherein a portion of at least one coil of said second plurality of coils extends through at least one coil of said first plurality of coils.

25. The method of claim 13, wherein the first centerline and the second centerline are coaxial.

26. The method of claim 13, wherein the first centerline and the second centerline are offset from one another.

\* \* \* \* \*